(12) United States Patent
McManus et al.

(10) Patent No.: US 6,527,324 B2
(45) Date of Patent: Mar. 4, 2003

(54) ADJUSTABLE SLIDE-OUT ROOM FOR MOBILE LIVING QUARTERS

(75) Inventors: Patrick W. McManus, Osceola, IN (US); Martin P. McManus, Mishawaka, IN (US)

(73) Assignee: VT Holdings II, Inc., Reno, NV (US)

( * ) Notice: Subject to any disclaimer, the term of this patent is extended or adjusted under 35 U.S.C. 154(b) by 0 days.

(21) Appl. No.: 09/887,839

(22) Filed: Jun. 22, 2001

(65) Prior Publication Data

US 2002/0084663 A1 Jul. 4, 2002

Related U.S. Application Data

(63) Continuation-in-part of application No. 09/360,040, filed on Jul. 23, 1999, now abandoned.
(60) Provisional application No. 60/094,214, filed on Jul. 27, 1998.

(51) Int. Cl.[7] .................................................. B60P 3/34
(52) U.S. Cl. .................. 296/26.13; 296/165; 296/26.14
(58) Field of Search .............................. 296/26.13, 171, 296/175, 165, 26.61, 26.14, 26.09, 26.12, 26.03; 52/67, 64, 79.5

(56) References Cited

U.S. PATENT DOCUMENTS

| 3,408,102 | A | | 10/1968 | McNamee |
| 3,596,416 | A | | 8/1971 | Hojka |
| 4,312,159 | A | * | 1/1982 | Paul ........................... 296/171 |
| 4,500,132 | A | | 2/1985 | Yoder |
| 5,050,927 | A | * | 9/1991 | Montanari .................. 296/165 |
| 5,237,782 | A | | 8/1993 | Cooper |
| 5,248,180 | A | | 9/1993 | Hussaini |
| 5,491,933 | A | | 2/1996 | Miller et al. |
| 5,567,003 | A | | 10/1996 | Gill |
| 5,570,924 | A | | 11/1996 | Few et al. |
| 5,577,351 | A | | 11/1996 | Dewald, Jr. et al. |
| 5,586,802 | A | | 12/1996 | Dewald, Jr. et al. |
| 5,620,224 | A | | 4/1997 | DiBiagio et al. |
| 5,706,612 | A | | 1/1998 | Tillett |
| 5,758,918 | A | | 6/1998 | Schneider et al. |
| 5,787,650 | A | | 8/1998 | Miller et al. |
| 5,788,306 | A | | 8/1998 | DiBiagio et al. |
| 5,791,715 | A | * | 8/1998 | Nebel ....................... 296/26.13 |
| 5,857,733 | A | | 1/1999 | Dewald, Jr. et al. |
| 5,894,698 | A | | 4/1999 | Dewald, Jr. et al. |
| 5,908,215 | A | | 6/1999 | Hanser et al. |
| 5,984,396 | A | | 11/1999 | Schneider |
| 6,052,952 | A | * | 4/2000 | Frerichs et al. ................. 52/64 |
| 6,108,983 | A | * | 8/2000 | Dewald et al. ........... 296/26.13 |
| 6,109,683 | A | * | 8/2000 | Schneider ................... 296/165 |
| 6,176,045 | B1 | * | 1/2001 | McManus et al. ........ 296/26.13 |
| 6,202,362 | B1 | * | 3/2001 | McManus et al. .......... 296/171 |
| 6,227,607 | B1 | * | 5/2001 | Dewald et al. ........... 296/26.13 |
| 6,286,883 | B1 | * | 9/2001 | Schneider et al. ........ 296/26.13 |
| 6,293,611 | B1 | * | 9/2001 | Schneider et al. .......... 296/165 |
| 6,345,855 | B2 | * | 2/2002 | Hanser et al. ............ 296/26.13 |
| 6,402,216 | B1 | * | 6/2002 | McManus et al. .......... 296/165 |
| 6,428,073 | B1 | * | 8/2002 | Blodgett, Jr. ............ 296/26.13 |
| 2001/0008059 | A1 | * | 7/2001 | McManus et al. ........ 296/26.13 |
| 2002/0074816 | A1 | * | 6/2002 | McManus et al. ........ 296/26.13 |
| 2002/0084661 | A1 | * | 7/2002 | McManus et al. ........ 296/26.14 |

* cited by examiner

*Primary Examiner*—Kiran Patel
(74) *Attorney, Agent, or Firm*—Baker & Daniels

(57) ABSTRACT

A recreational vehicle includes structure defining side walls of a main living unit mounted on a frame and a slide-out room which extends and retracts through an aperture in one of the side walls. Adjustments are provided to adjust the angular orientation of the slide-out room without respect to the side wall of the main living unit, to adjust the vertical position of the slide-out room in the extended position and to adjust the tilt of the slide-out room. Further adjustments are also provided to adjust the position of the back wall of the slide-out room in the retracted position to assure that trim and decals applied to the side wall of the unit and extending over the back wall of the slide-out room are properly aligned.

31 Claims, 19 Drawing Sheets

ADJUSTABLE SLIDE-OUT ROOM FOR MOBILE LIVING QUARTERS

This application is a Continuation-In-Part application of Ser. No. 09/360,040 filed Jul. 23, 1999 abandoned, which claims domestic priority based upon U.S. Provisional Patent Application Serial No. 60/094,214 filed Jul. 27, 1998.

BACKGROUND OF THE INVENTION

This invention relates to a slide-out room for a recreational vehicle or similar mobile living quarters unit and a mechanism for effecting adjustment of the slide-out room relative to the main living area.

The width of recreational vehicle and manufactured housing units is limited to that which can be accommodated for traveling on public roads. Accordingly, it is common to provide recreational vehicles with a slide-out room which can be retracted into the main living area when the recreational vehicle unit is moved, but which can be extended from the main living quarters to provide auxiliary living space when the unit is parked for use.

The slide-out room is extended and retracted through an aperture in one of the side walls of the structure defining the main living area. The slide-out room includes a back wall which, may register with the aperture when the slide-out room is in the fully retracted position within the main living quarters. It is desirable that the back wall register with the aperture not only to assure that the aperture is completely closed, but also because decals are commonly applied to the side-walls of recreational vehicles and it is desirable that the portion of decal extending across the back wall of the slide-out room be aligned with the portions of the decal extending along the main wall. For all of these reasons, it is desirable to be able to adjust the back wall of the slide-out room with respect to the aperture in the wall defining a part of the main living area through which the slide-out room is extended and retracted.

Slide-out rooms are generally supported on the main living area by coaxial extendable tubular members. Commonly, two or more extendable tubular members are used to support a slide-out room, but with smaller slide-out rooms only a single tubular member may be used to minimize costs. However, problems of aligning and orientating the slide-out room are particularly acute when the slide-out room is supported by only a single tubular member. According to another aspect of the present invention, adjustments are provided to adjust the position of the slide-out room with respect to the extendable member, thus providing accommodations for the deflection inherent in the slide-out room and the single tubular member upon which it is supported. Accordingly, it is possible to use a single extendable member to support a slide-out room.

SUMMARY OF THE INVENTION

The present invention provides an adjustable alignment mechanism for a slide-out room for installation in the space between the main living area floor and the slide-out room floor. The alignment mechanism includes a base plate attachable to a surface of either the main floor or slide-out room floor in the space between the floors. A pivot assembly has a pivot lever attached to the base plate at one end with a roller at the opposite end bearing against the other floor surface. A wedge assembly is attached to the base plate and is operable to adjust the pivot angle of said pivot assembly relative to said base plate thereby raising and lowering the roller end of the pivot lever to vertically adjust the position of the slide-out room relative to the main room.

In a preferred embodiment, the alignment mechanism includes a wedge threaded onto an adjusting screw and disposed between a pair of brackets attached to the base plate so that the wedge slides toward one bracket to engage camming blocks on the pivot lever to increase the pivot angle of the pivot lever when the adjusting screw is rotated in one direction and the wedge slides toward the other bracket to decrease the pivot angle of the pivot lever when the adjusting screw is rotated in the opposite direction. A retaining nut holds the adjuster assembly together.

In a most preferred embodiment, the pivot lever is pivotably attached to one of the brackets of the adjuster assembly by pivot screws receivable in threaded holes in the camming blocks.

Preferably, the alignment mechanism is used in pairs at the slide-out room aperture to align the back wall of the slide-out room with the side wall of the main room.

Alternatively, additional alignment mechanisms may be positioned inward from the slide-out room aperture to adjust other portions of the slide-out room relative to the main room Accordingly, the invention accomplishes a primary objective of providing a means to adjust the back wall of the slide-out room with respect to the aperture in the main living area wall through which the slide-out room extends and retracts. The invention accomplishes a further objective of providing a means to adjust the position of the slide-out room with respect to the main living area.

These and other advantages of the present invention will become apparent from the following description, with reference to the accompanying drawings.

Figure 1:
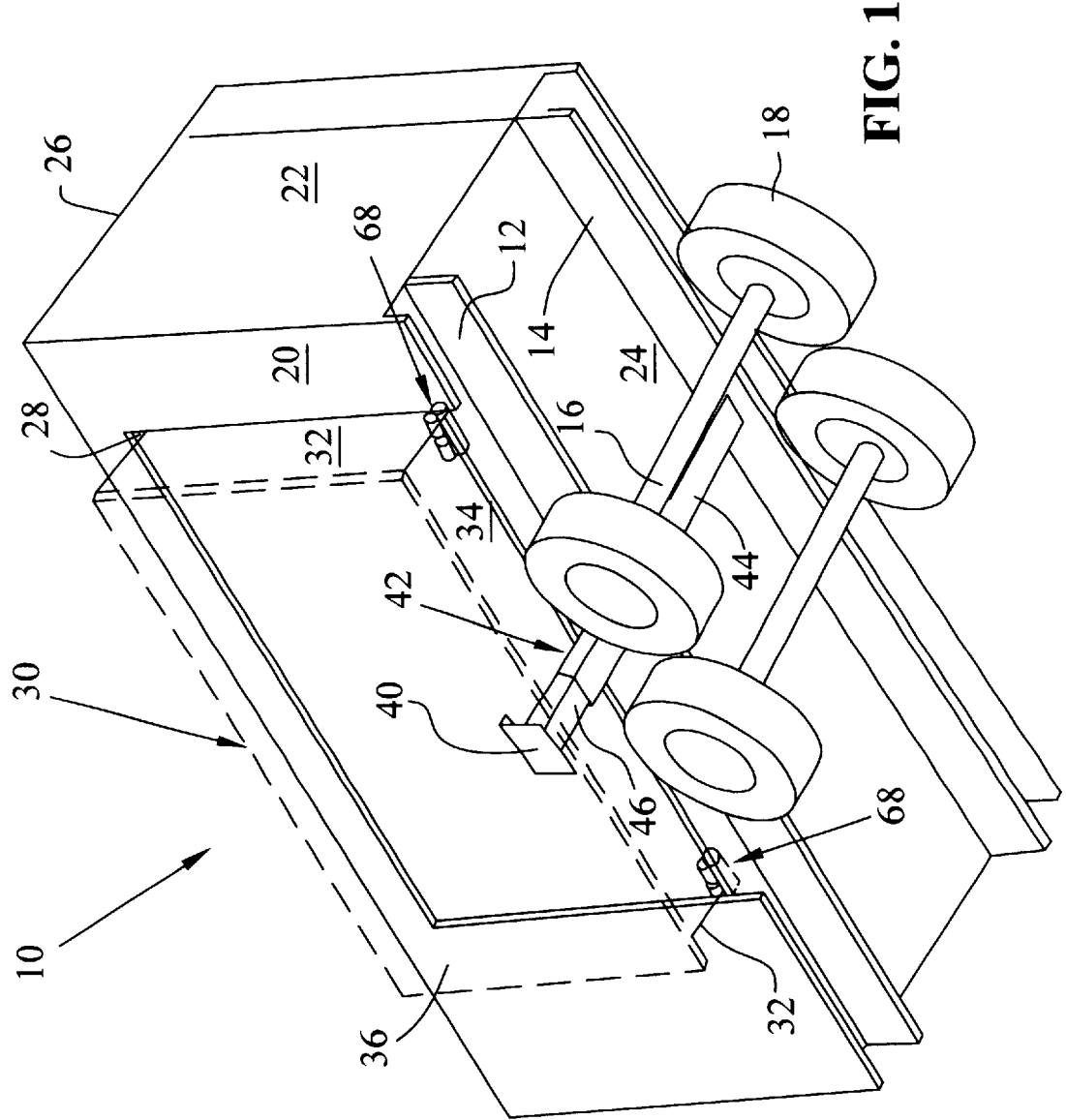
FIG. 1 is a view in perspective, taken from below, of a recreational vehicle equipped with a slide-out room using an extendable support member and adjustment mechanisms pursuant to the present invention, the slide-out room being indicated in dashed lines.

Referring now to the drawings and with reference first to FIG. 1, a mobile living quarters, such as a recreational vehicle, is generally illustrated by the numeral 10. The unit 10 includes a frame consisting of a pair of longitudinally extending, transversely spaced main frame members 12, 14, upon which a pair of axles 16 are mounted through an appropriate suspension system (not shown). Wheels 18 are mounted on the axles 16 to permit movement of the unit 10. Structure defining a main living area includes side walls, only one of which is shown at 20, and end walls, only one of which is illustrated at 22, a floor 24, which is supported by the main frame members 12, 14, and a roof 26.

One of the side walls 20 is provided with an aperture 28 through which a slide-out room generally indicated by the numeral 30 extends and retracts. Slide-out room 30 includes side walls 32, a floor 34, and a back wall 36, which extends between the side walls 32 and the floor 34. The back wall 36 is attached to a connecting plate 40 which in turn is mounted on an extendable member generally indicated by the numeral 42. The extendable member 42 includes an outer tubular member 44 and an inner tubular member 46, which is slidably received within the outer tubular member 44. The outer tube 44 is attached to the frame member 14, as more fully described herein.

As discussed above, it is important that the back wall 36 of the slide-out room properly register with the aperture 28 as the slide-out room is moved into the retracted position not only to assure that the structure is weather tight but also because any marked discrepancies in the orientation of the back wall 36 with respect to the side wall 20 is unsightly. For example, manufacturers of recreational vehicles commonly place decorative trim or decals along the length of the side wall 20, and it is desirable that the portion of the decal extending along the back wall 36 be aligned with the portion of the decal extending along the side wall 20. To adjust the slide-out room with respect to the side wall 20 when the slide-out room is in the retracted position, adjustment mechanisms generally indicated by the numeral 68 raise the room so that the back wall properly registers with the aperture.

Figure 2:
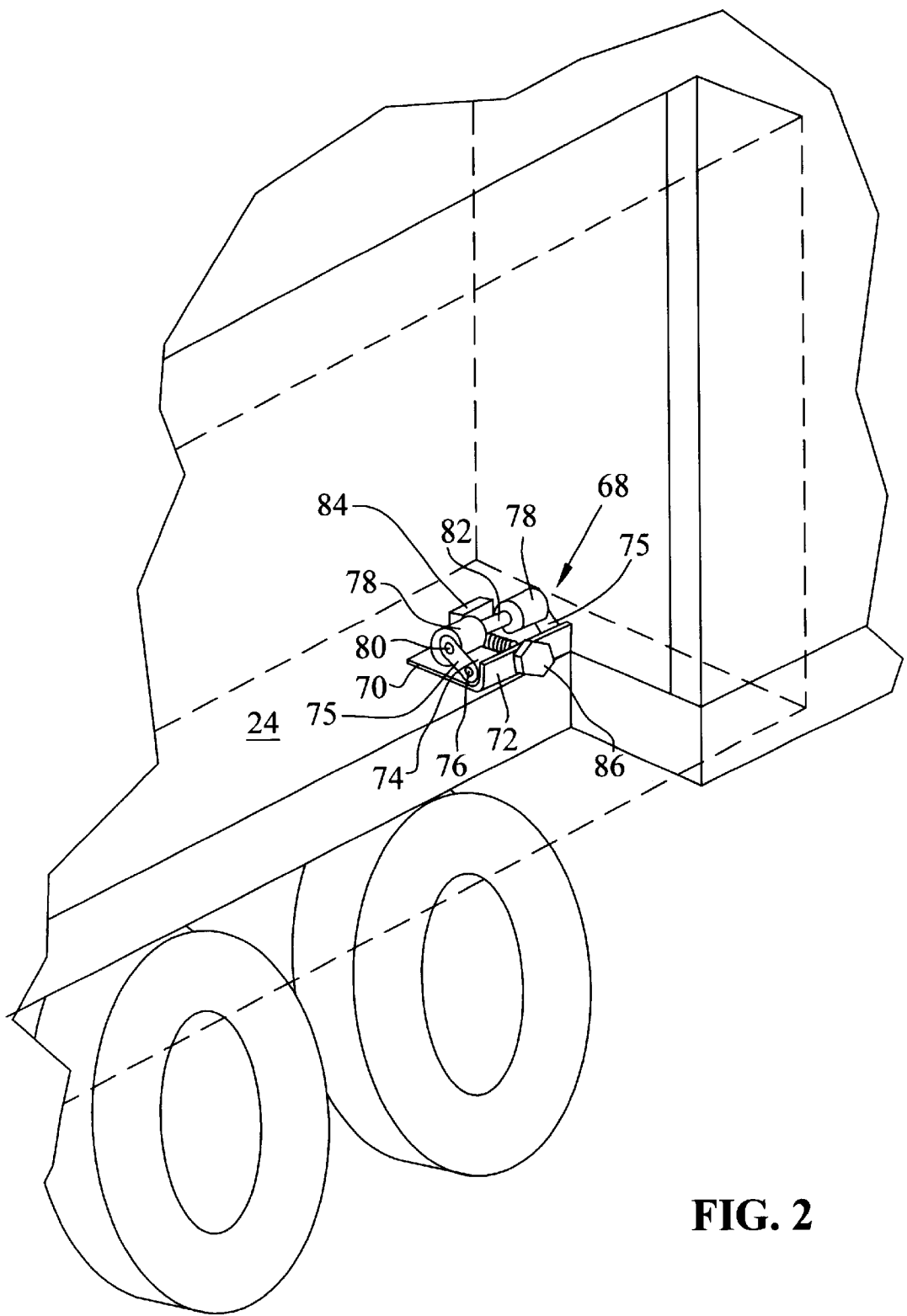
FIG. 2 is a view in perspective, taken close in, and illustrating an adjustment device for adjusting the back wall with the slide-out room with respect to the aperture in the main living.
Figure 3:
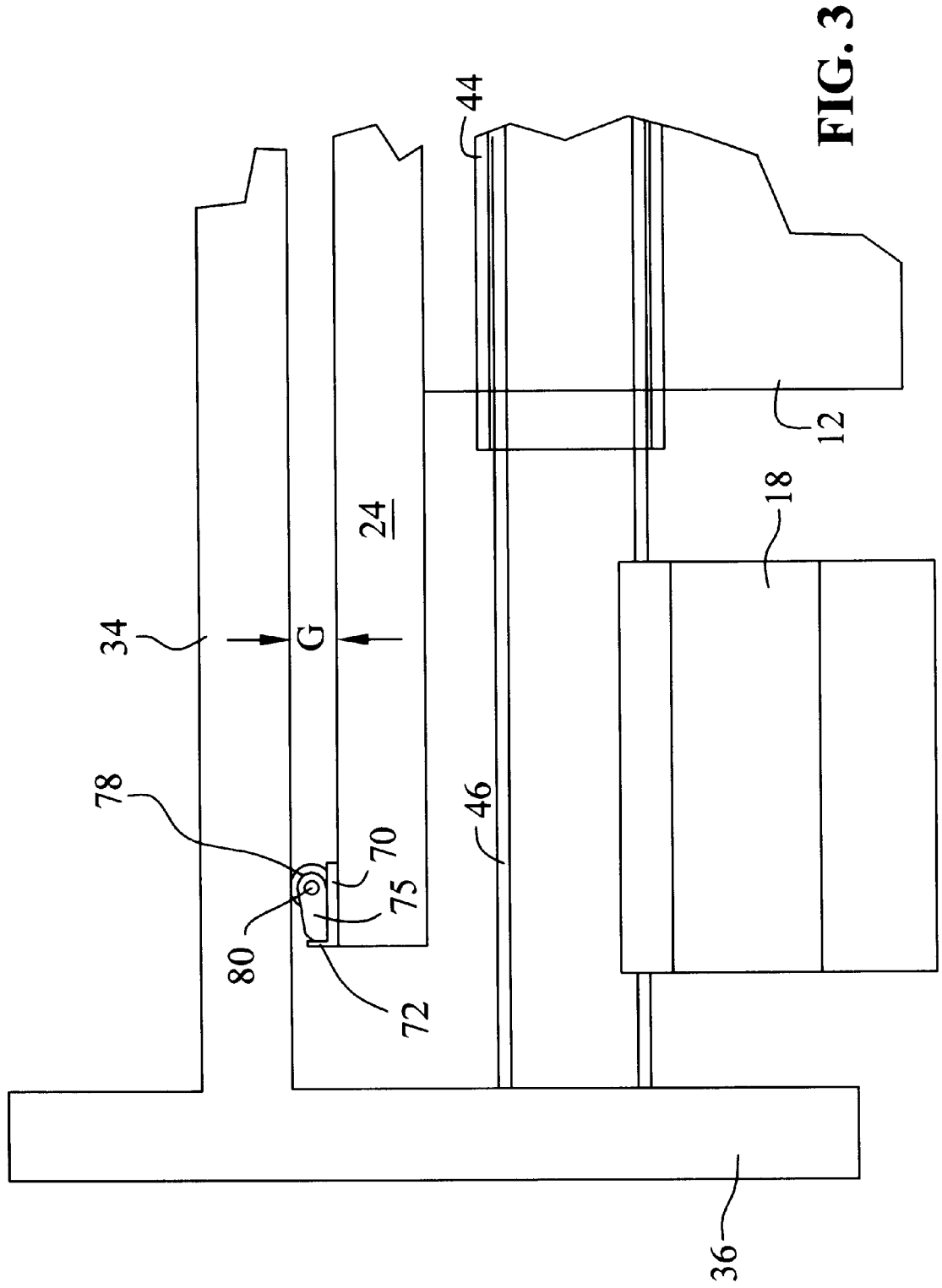
FIGS. 3 and 4 are detailed cross-sectional views taken through the lower portion of the slide-out room and main living quarters, illustrated in the manner in which the adjustment mechanism illustrated in perspective in FIG. 5 operates.
Figure 4:
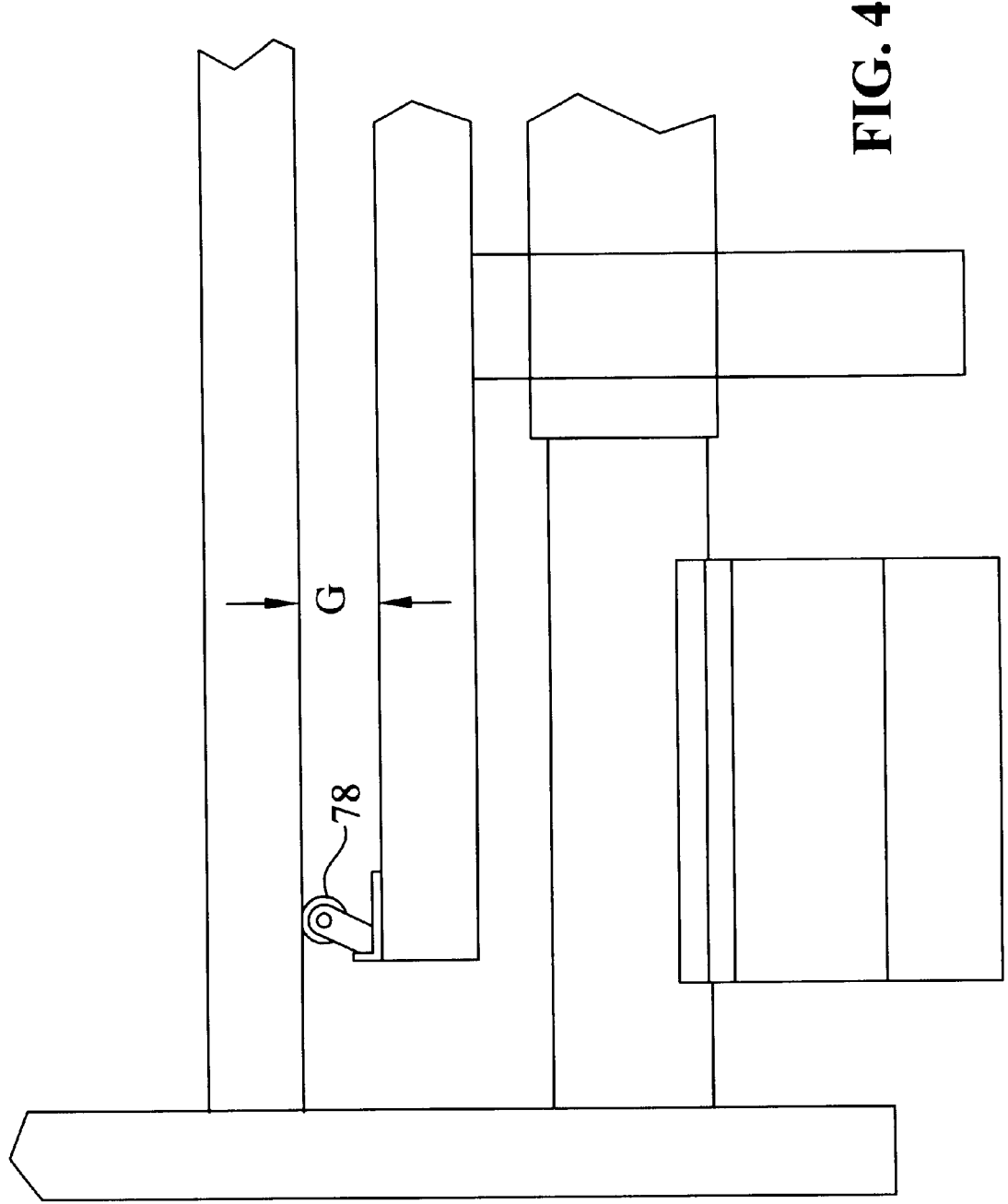
Figure 5:
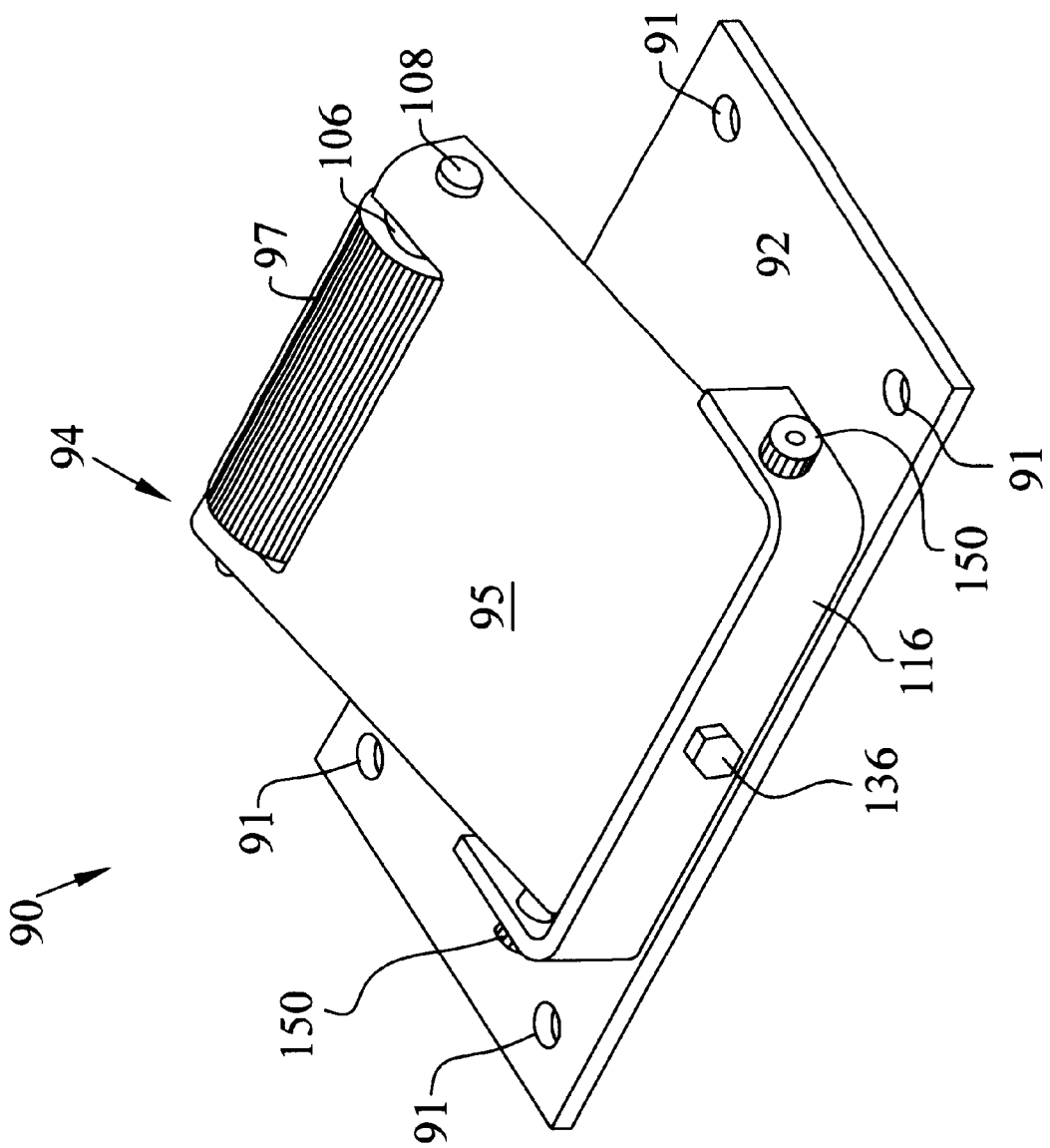
FIG. 5 is a perspective view of an adjustable alignment mechanism similar to that shown in FIGS. 2–4.

Referring to the embodiment of FIGS. 2–4, the adjustment mechanism 68 includes a base plate 70 which is secured to the floor 24 of the main living quarters and terminates in an upwardly projecting lip 72. A pivoting member 74 is pivotably mounted on base plate 70 via pivot connection 76. A pair of rollers 78 are mounted on an axle 80 which is mounted on the pivoting member 74 to permit the rollers 78 to turn. A spacer 82, which may be a part of the pivoting member 74, is disposed between the rollers 78. The spacer 82 may be integral with the pivoting member 74. The axle 80 extends through the spacer 82. A wedge-shaped member 84 is slidably mounted on the base plate 70 and is threadably engaged with a bolt 86, which extends through the lip 72. Accordingly, in response to rotation of the bolt 86, the wedge-shaped member 84 is urged toward or away from the lip 72, depending upon the direction of rotation of the bolt 86. As the wedge-shaped member is advanced toward the lip 72, the wedge-shaped member 84 engages the spacer 82, thereby causing the pivoting member 74 to pivot upwardly away from the floor 24 as the wedge-shaped member 84 is advanced towards the lip 72. Accordingly, the rollers 78 are elevated as the wedge-shaped member 84 is advanced toward the lip 72 in response to rotation of the bolt 86 in one direction and are lowered in response to movement of the wedge-shaped member 84 away from lip 72 in response to rotation of the bolt 86 in the opposite direction. Preferably, cut out apertures (not shown) are formed in the base plate 70 so that when the pivoting member 74 is dropped to the lowermost position, the distance between the upper surface of the roller 78 and the floor 24 is minimized.

Referring now to FIGS. 3 and 4, the rollers 78 are shown at their lowermost position in which a portion of the outer periphery of the roller 78 are within the aforementioned apertures (not shown). The floor 34 of the slide-out room is supported on the rollers 78 so that the rollers 78 rotate as the extendable room is extended or retracted. In FIG. 4, the bolt 86 has been rotated to advance the wedge-shaped member toward the lip 72 a distance such that the rollers 78 are elevated to their uppermost position, thereby causing the gap G in FIG. 7 to be at its maximum. The wedge 84 may be stopped in any position such that the rollers 78 are elevated at a position intermediate the FIGS. 3 and 4 position, thereby adjusting the position of the back wall 36 to properly align with the edges of the aperture and also to cause any decals, trim, mounted on the outer wall 36 to align with corresponding portions of the trim, decals etc. mounted on the wall 20.

Figure 6:
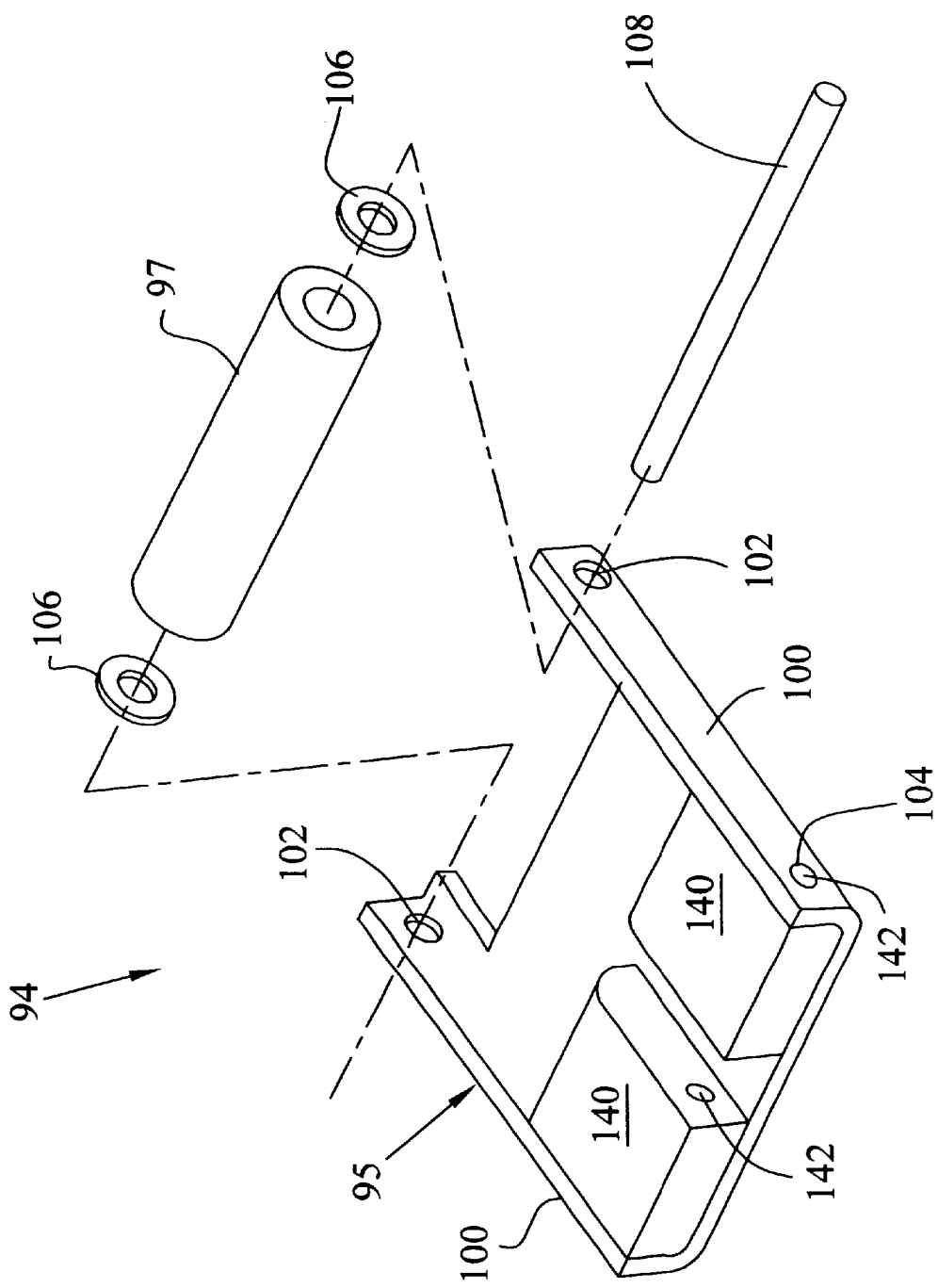
FIG. 6 is an exploded perspective view taken from the underside of the pivot lever assembly of the alignment mechanism of FIG. 5.
Figure 7:
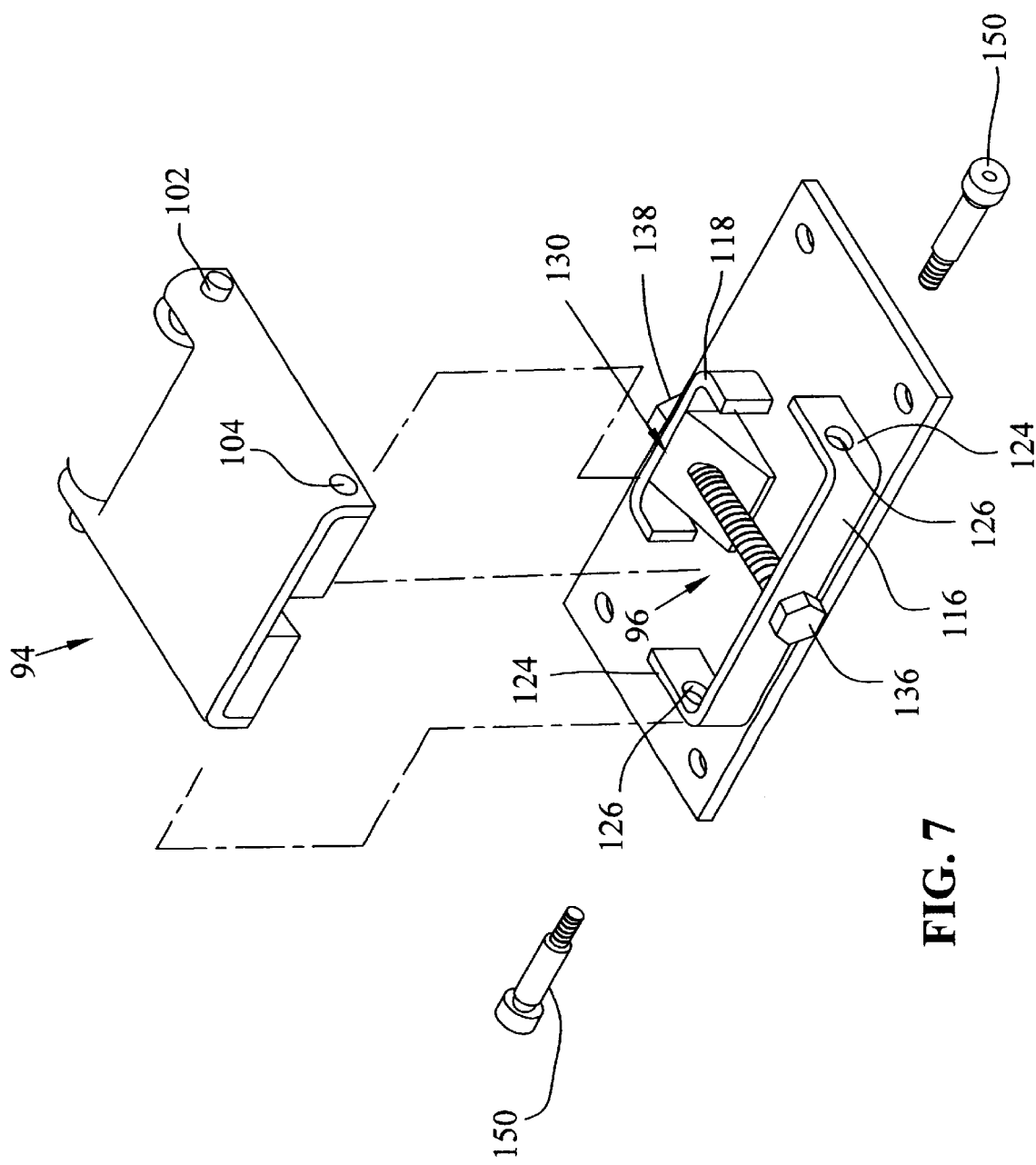
FIG. 7 is an exploded view of the alignment mechanism of FIG. 5 showing the wedge assembly.

With reference now to FIGS. 5–10, another embodiment of the alignment mechanism will be shown on another recreational vehicle. With reference to first FIG. 5, the alignment mechanism 90 will be described in greater detail. The mechanism generally comprises a base plate 92, a lever assembly 94, and a wedge assembly 96. With reference to FIG. 7, the base plate 92 includes a plurality of mounting holes for attachment as will be described herein.

With reference to FIG. 6, the lever assembly 94 will be described. Pivot lever assembly 94 is shown in FIG. 6 disassembled from the base plate 92. The view in FIG. 6 is from the underside of the pivot lever assembly to better show its structure. The pivot lever assembly 94 includes a pivot lever 95, a pair of camming blocks 140 and a roller 97 as shown in FIG. 6. Pivot lever 95 includes a lip 100 on each side with each lip 100 containing apertures 102 and 104. In a preferred embodiment, the assembly 94 also includes a pair of washers 106. Finally, lever assembly 94 includes an axle 108.

Figure 8:
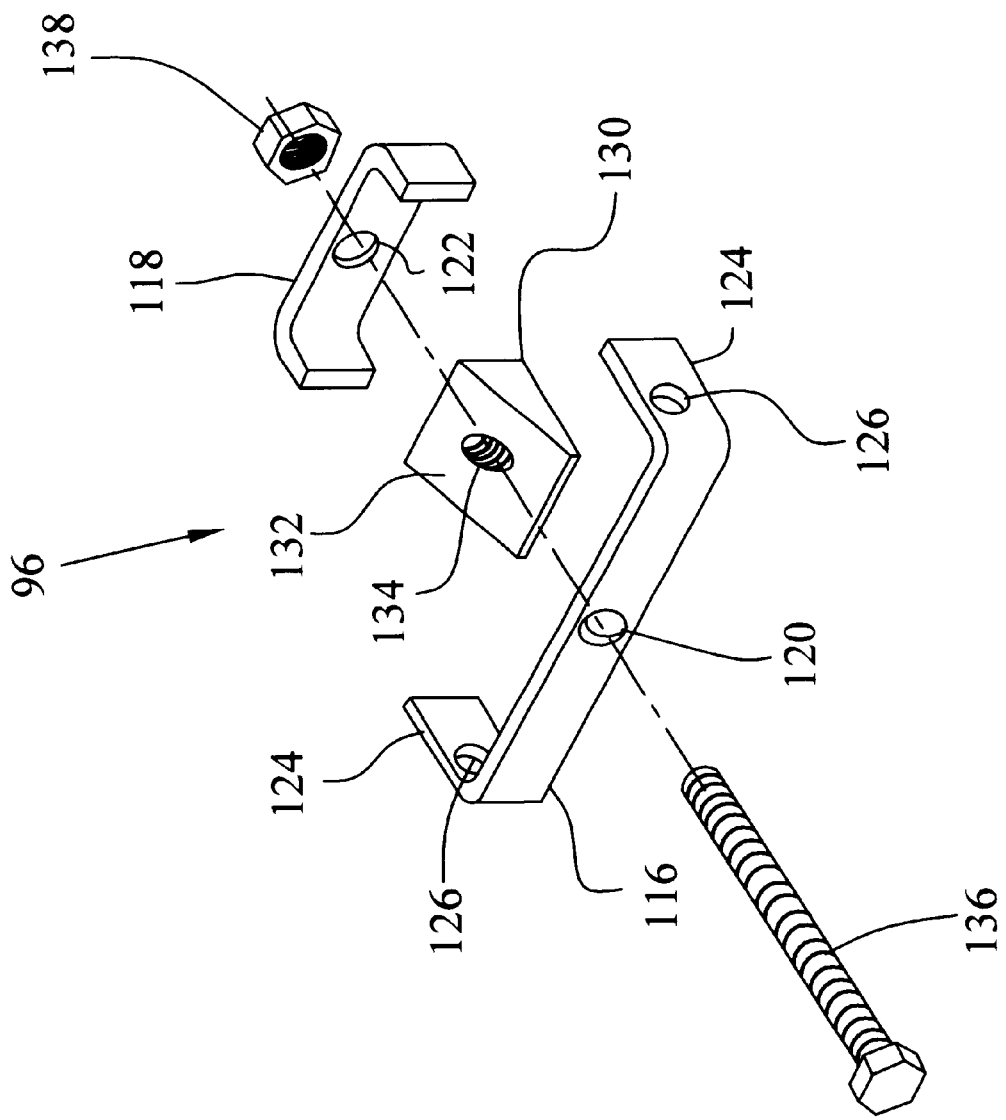
FIG. 8 is an exploded view showing the wedge assembly in detail.

With reference to FIG. 8, the wedge assembly 96 is shown separated from base plate 92. The wedge assembly includes two U-shaped brackets, 116 and 118, with respective central apertures 120, 122. Bracket 116 further includes two arm sections 124 having apertures at 126. The assembly further comprises a threaded wedge member 130, having a camming surface at 132 and a threaded aperture 134. Finally, the assembly includes a threaded fastener 136 and a nut 138.

In a preferred embodiment of the invention, wedge assembly 96 is attached to base plate 92. Brackets 116 and 118 are spaced apart and fixedly attached to the base plate 92 such as by welding. Wedge 130 is positioned between brackets 116 and 118 for sliding movement therebetween. The spacing between brackets 116 and 118 determines the range of movement for wedge 130. Adjusting screw 136 extends through aperture 120 of bracket 116, threadably engages wedge 130, and continues through aperture 122 in bracket 118.

Retaining nut 138 is affixed to the end of adjusting screw 136 to prevent removal of adjusting screw 136 from either of brackets 116 or 118. Retaining nut 138 is suitably affixed to adjusting screw 136 such as by welding. Alternatively, adjusting screw 136 can have an end section at a reduced diameter providing a shoulder for retaining nut 138 to bear against. When the adjusting wedge 130 is assembled on adjusting screw 136, rotation of adjustment screw 136 causes adjusting wedge 130 to slide on base plate 92 towards or away from pivot bracket 116 depending on the direction or rotation of adjusting screw 136.

With reference again to FIG. 6, camming blocks 140 are fixedly attached to the underside of pivot lever 95, preferably by welding. The camming blocks are positioned so that apertures 104 are in alignment with holes 142. Roller 97 is rotatably mounted on axle 108 and attached at the opposite end of pivot lever 95 by insertion of axle 108 through apertures 104. Axle 108 can be mounted in aperture 102 through an interference fit. Alternatively, axle 108 may be fixedly attached within aperture 102 such as by welding. In a preferred embodiment, washers 106 are inserted between the roller 97 and the lip 100 of pivot lever 95.

Returning now to FIG. 7, the assembly of the alignment mechanism is completed by the attachment of pivot lever assembly 94 to bracket 116 which is accomplished with pivot screws 150. Pivot screws 150 extend through apertures 126 of bracket 116, through apertures 104 in pivot lever lips 100, and then thread into holes 142 of camming blocks 140 to form the completed assembly. With the exception of the roller, the alignment mechanism is preferably of steel construction. The roller may be made of bronze or plastic with plastic being preferred.

In the completed mechanism, adjusting screw 136 is freely rotatable in brackets 116 and 118. The threaded engagement of adjusting screw 136 with wedge 130 moves wedge 130 fore and aft along the axis of adjusting screw 136 as adjusting screw 136 is rotated either clockwise or counterclockwise. Clockwise rotation of adjusting screw 136 draws wedge 130 toward pivot bracket 116. As adjuster wedges 130 moves toward pivot bracket 116, camming surface 132 of wedge 130 engages camming blocks 140 on pivot lever 95. Engagement of camming surface 132 with camming blocks 140 causes pivot assembly 94 to pivot upward raising roller 97. When installed on the main room floor in the space between main room floor 20 and slide-out room floor 35, this upward movement of pivot arm 95 and roller 97 raises slide-out room floor 35 at the location of the alignment mechanism. Likewise counter-clockwise rotation of adjusting screws 136 moves wedge 130 towards stop brackets 118 decreasing the pivot angle of pivot arm 95 and lowering roller 97 to consequently lower slide-out room floor 35 of the slide-out room 14.

Figure 9:
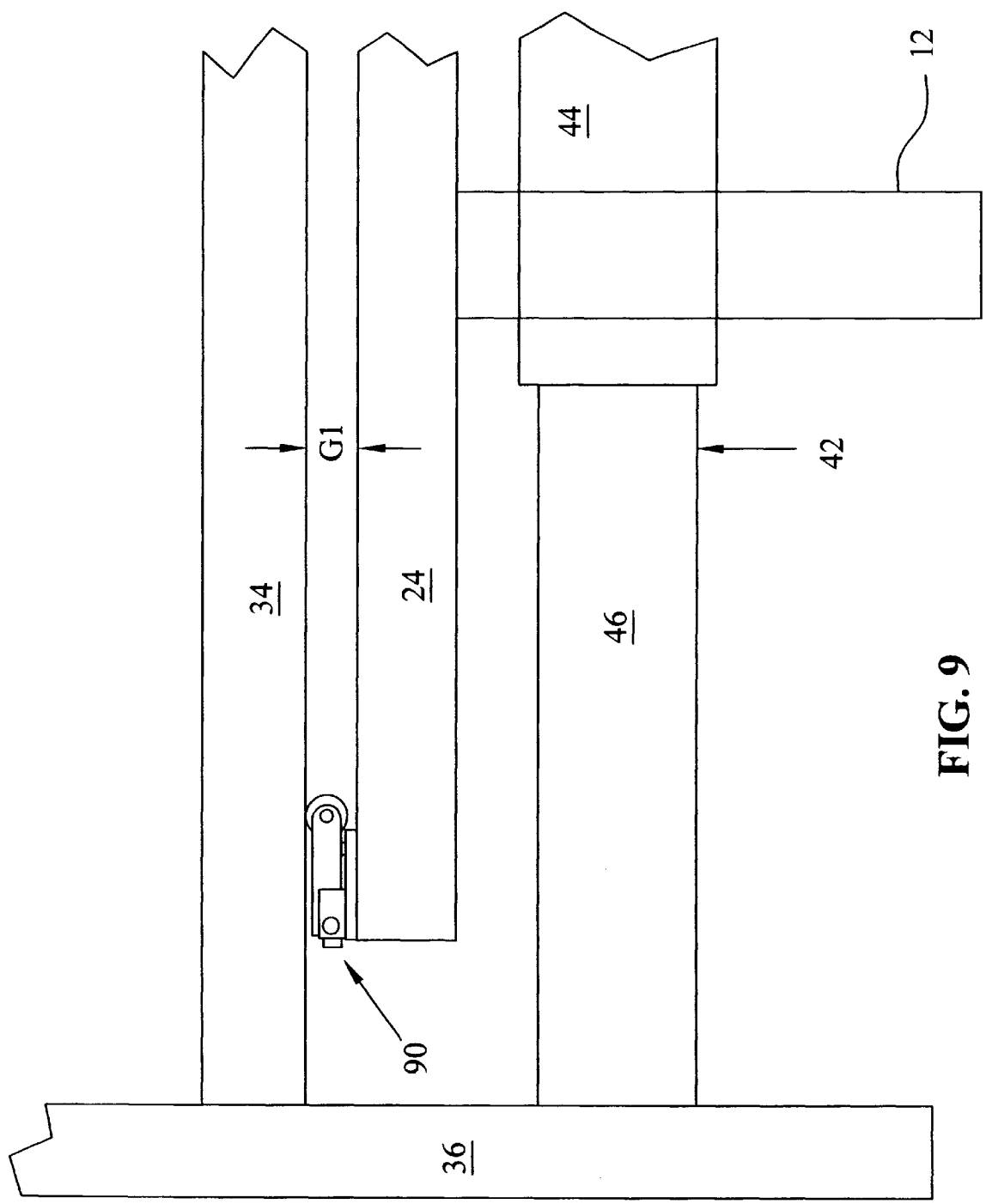
FIG. 9 is a cross-sectional view taken through the lower portion of the main living area and slide-out room with the alignment mechanism of FIG. 5 installed and set at its lower most position.
Figure 10:
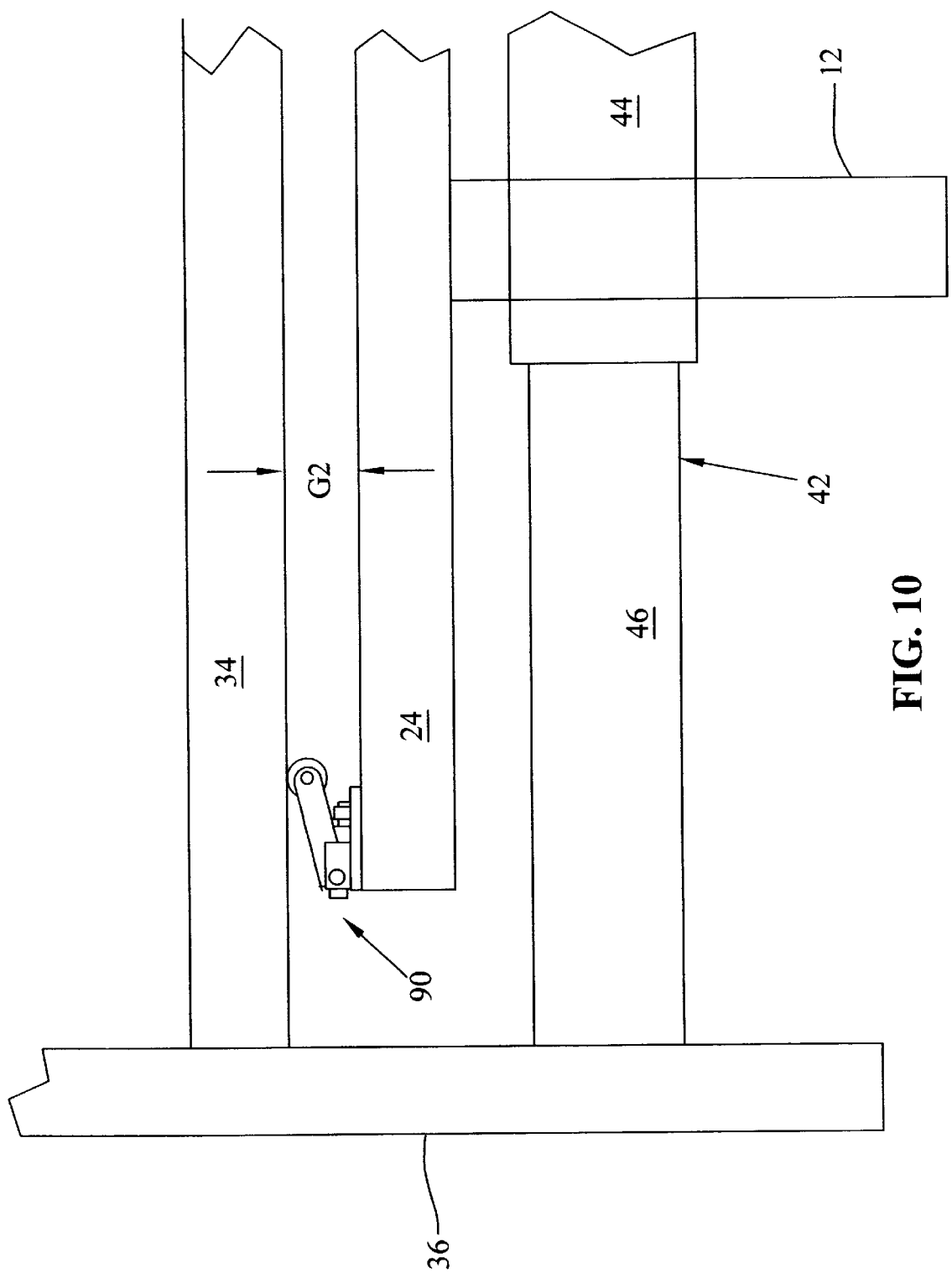
FIG. 10 is a cross-sectional view taken through the lower portion of the main living area and slide-out room with the alignment mechanism of FIG. 5 installed and with the pivot lever elevated raising the slide-out room floor to align the slide-out room back wall.

The alignment mechanism is installed so that the adjusting screw 136 is accessible from the underside of the vehicle while the slide-out room is retracted. The operation of the alignment mechanism is shown in FIGS. 9 and 10. In FIG. 9, the alignment mechanism 90 is shown mounted in space G-1 between main floor 24 and slide-out room floor 34. Slide-out room back wall 36 is extended and retracted through the movement of extendable member 46 into and out of the extendable member outer tube 44. Main room floor 24 and extended outer member tube 44 are depicted being supported by main frame member 14. In FIG. 9, the alignment mechanism 90 is shown in its minimum position in space G-1.

In FIG. 10, the adjusting screw 136 of the alignment mechanism has been rotated to advance the wedge 130 towards the pivot bracket 116. Accordingly, the roller 97 is now raised due to the increased pivot angle from the action of the wedge against the camming blocks 140 in the pivot lever assembly to increase the relative space between main room floor 24 and slide-out room floor 34. This increased space is represented by G-2 in FIG. 10.

Wedge 130 may be stopped at any position between pivot bracket 116 and stop bracket 118 to align slide-out room back wall 36 with the main living area wall (not shown) so that any trim or decals mounted on the outside of the back wall will align with corresponding trim or decals mounted on the outside of the main living area wall at the aperture.

It will be understood that the adjustments provided permit the slide-out room 30 to be adjusted vertically when it is in the extended position by operation of the bolt 58 or 136 and the back wall 36 may be adjusted vertically by different dimensions at either side. It should also be understood that the embodiments of FIGS. 2–10 allow for vertical adjustment of the back wall 36 throughout its full range of travel, that is, from the fully retracted position to the fully extended position, as the rollers apply vertical force to the underside of the slide-out room.

It should also be understood that more than two of the lifter assemblies 68, 90 could be installed. For example, in the case where the slide-out room was for a master bedroom, when the bed is in the slide-out portion, it would be preferable to have an adjustment at all four corners. It should also be understood that due to the design, the adjustment can be made without removal of the room, as the adjustment bolts 86, 136 will be accessible from the exterior.

Referring now to FIGS. 11–14, a further alternate embodiment of the adjustment mechanism is disclosed. An adjustment mechanism generally indicated by the numeral 188 is mounted on the underside of the floor 34 of the slide-out room 30 adjacent the corner formed by the floor 34, a corresponding side wall 32, and the back wall 36. Adjustment mechanism 188 includes a relatively flat plate 190 (FIG. 12) having a downwardly sloping portion 192 adjacent one end thereof, a tapering portion 194 adjacent the opposite end thereof defining a ramp surface, and a relatively thin portion 196 having holes 198 which receive fasteners securing the plate 190 to the floor 34. Accordingly, the plate 190 deflects about a hinge line 200. A pair of parallel, longitudinally extending slots 202 extend through the plate 190 and continue onto the downwardly sloping portion 192. Slots 202 receive fasteners 204 which releasably secure a semi-cylindrical member 206 to the upper surface 208 at a desired position along the slots 202. As the member 206 is moved toward the tapering surface 194, the plate 190 deflects further about the hinge line 200.

Figure 11:
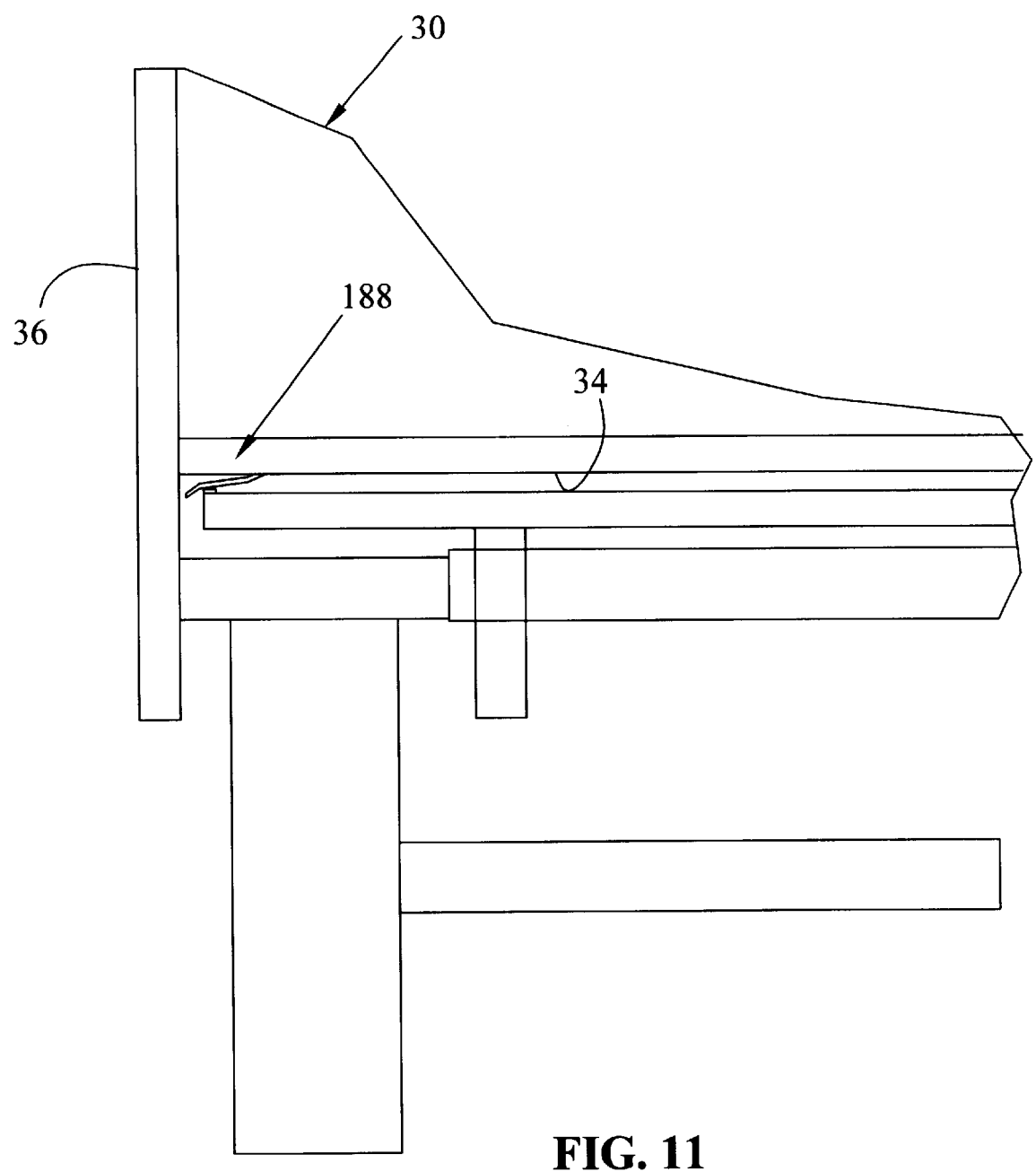
FIG. 11 is a fragmentary cross-sectional view through the lower portion of the slide-out room in the fully retracted position illustrating another embodiment of the adjustment mechanism.
Figure 12:
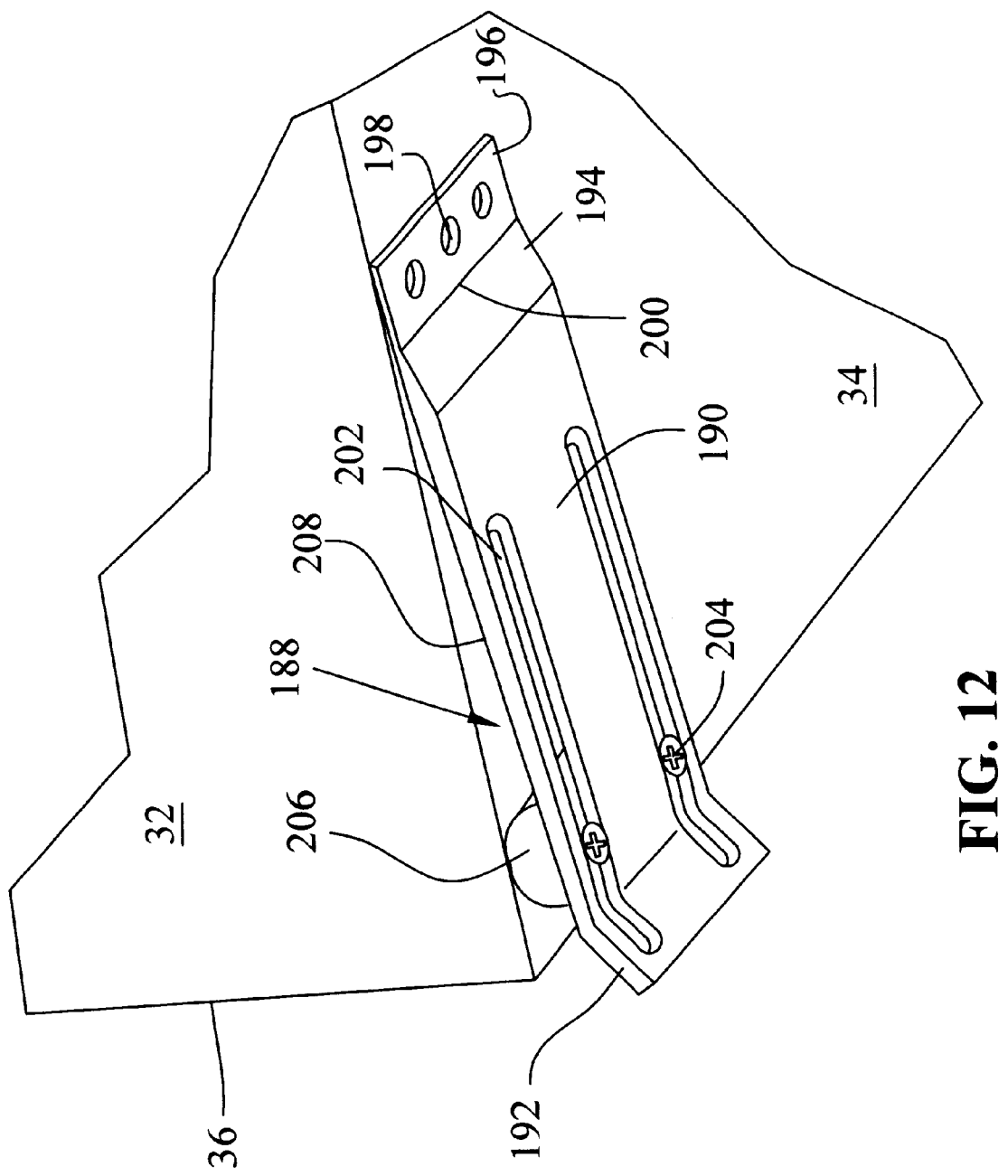
FIG. 12 is a bottom perspective view of the floor of the slide-out room, illustrating the adjustment device illustrated in FIG. 11.
Figure 13:
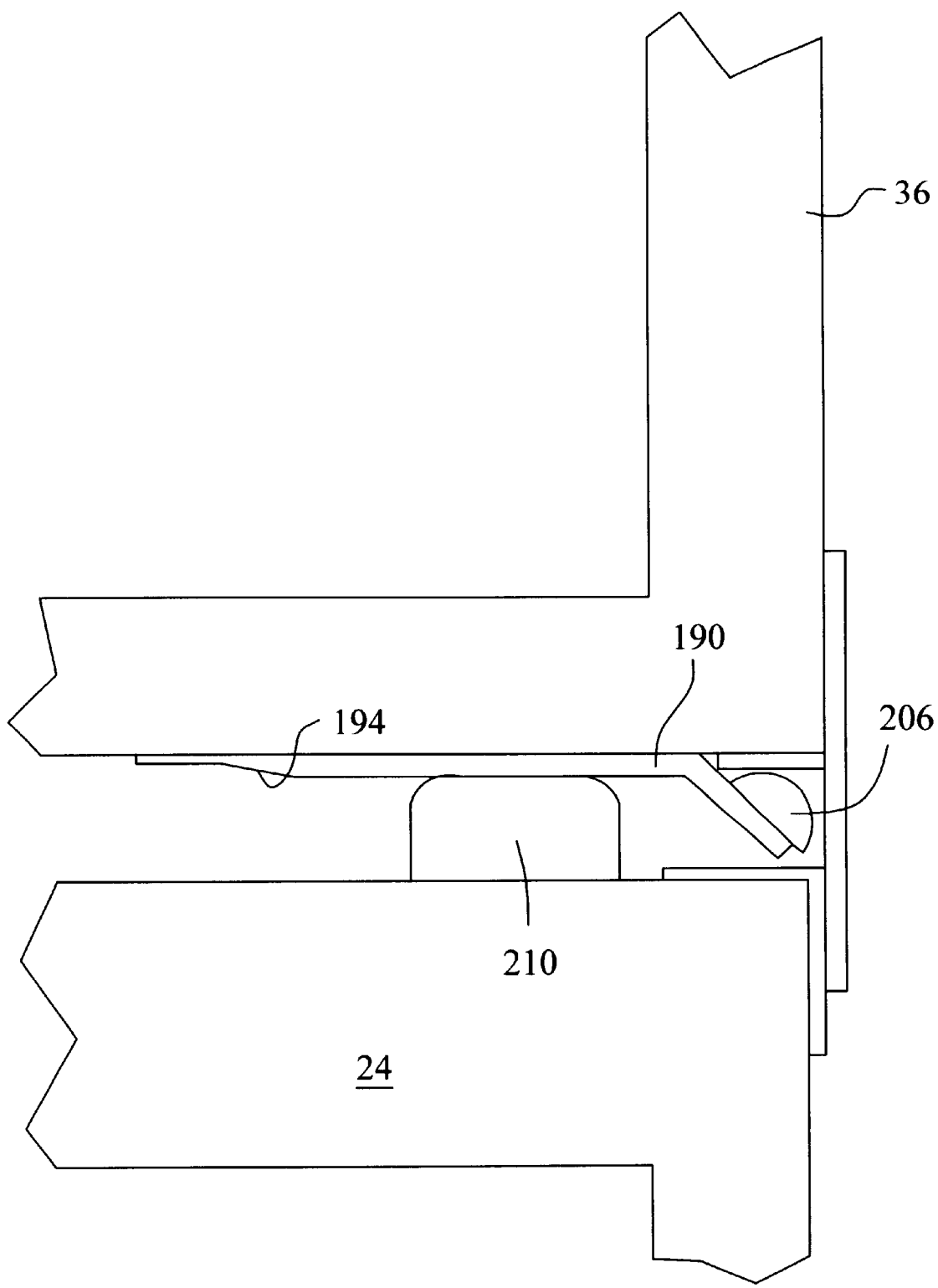
FIG. 13 is a fragmentary cross-sectional view taken through the lower portion of the back-wall of the slide-out room and the floor and outer wall of the main living quarters of the recreational vehicle illustrated in FIG. 11, and illustrating the adjustment device in which the corresponding corner of the slide-out room is in the lowest position.
Figure 14:
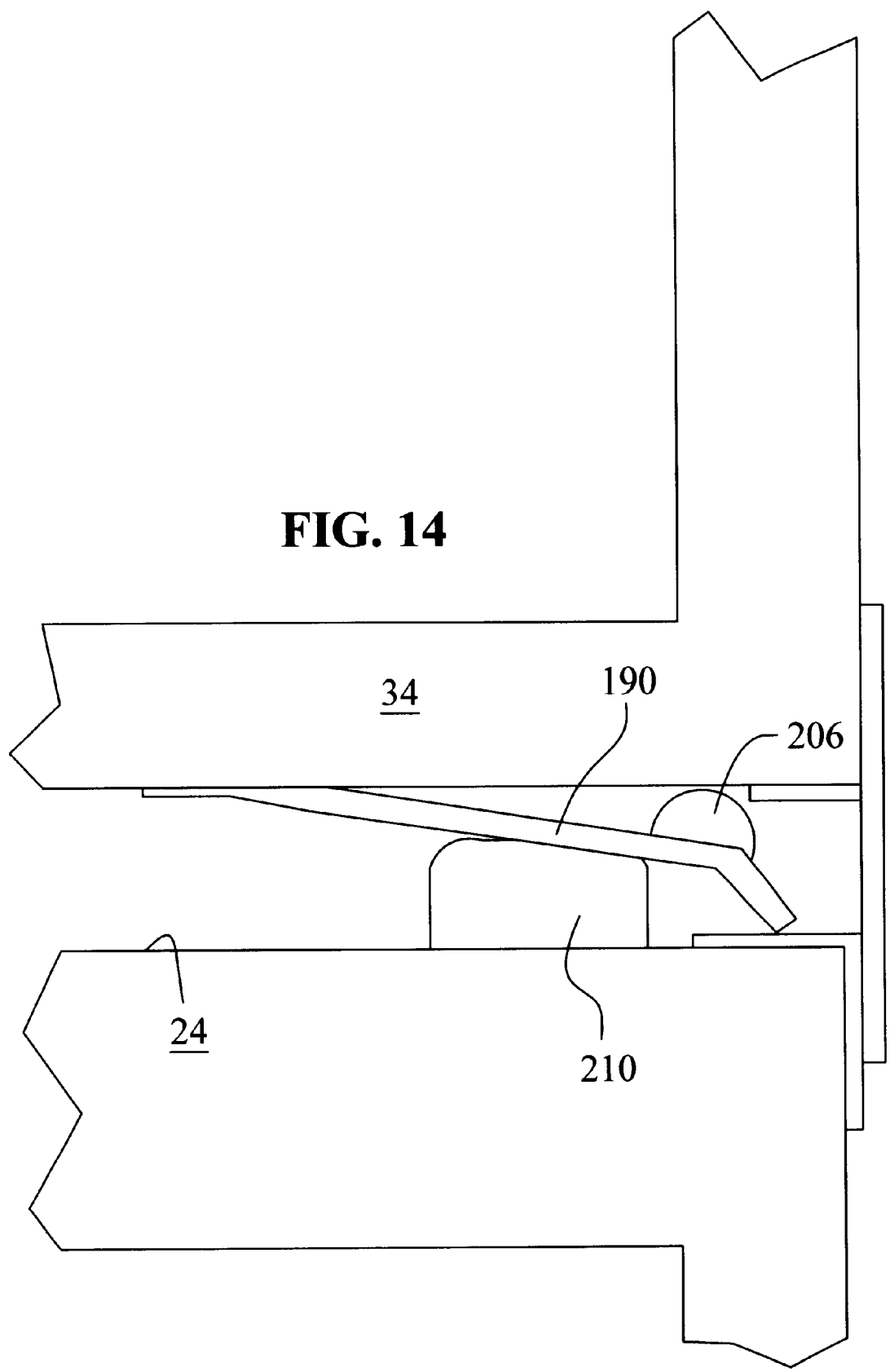
FIG. 14 is a view similar to FIG. 13, but illustrating the adjustment device raising a corner of the slide-out room.

It is common that a wear bar 210 (FIG. 13) be installed on the floor 24 of the main living area. The wear bar 210 extends transversely across the width of the aperture 28. The tapering portion 194 permits the plate 100 to pass over the wear bar 210 as the slide-out room 30 is moved into the fully retracted position as illustrated in FIG. 11. In FIG. 12, the semi-cylindrical member 206 has been moved to the downwardly sloping portion 192 of the plate 190 and does not engage the underside of the floor 34, so that the slide-out room 30 is in the lowermost position. Referring to FIG. 14, the semi-cylindrical member 206 has been moved upwardly to engage the underside of the floor 34 of the slide-out room, thereby deflecting the plate 190 as illustrated, such that the room will be moved to a raised position as compared to the FIG. 13 position. It will be noted that the closer the semi-cylindrical number 206 is moved toward the hinge point 200, the further the room will be raised.

Figure 15:
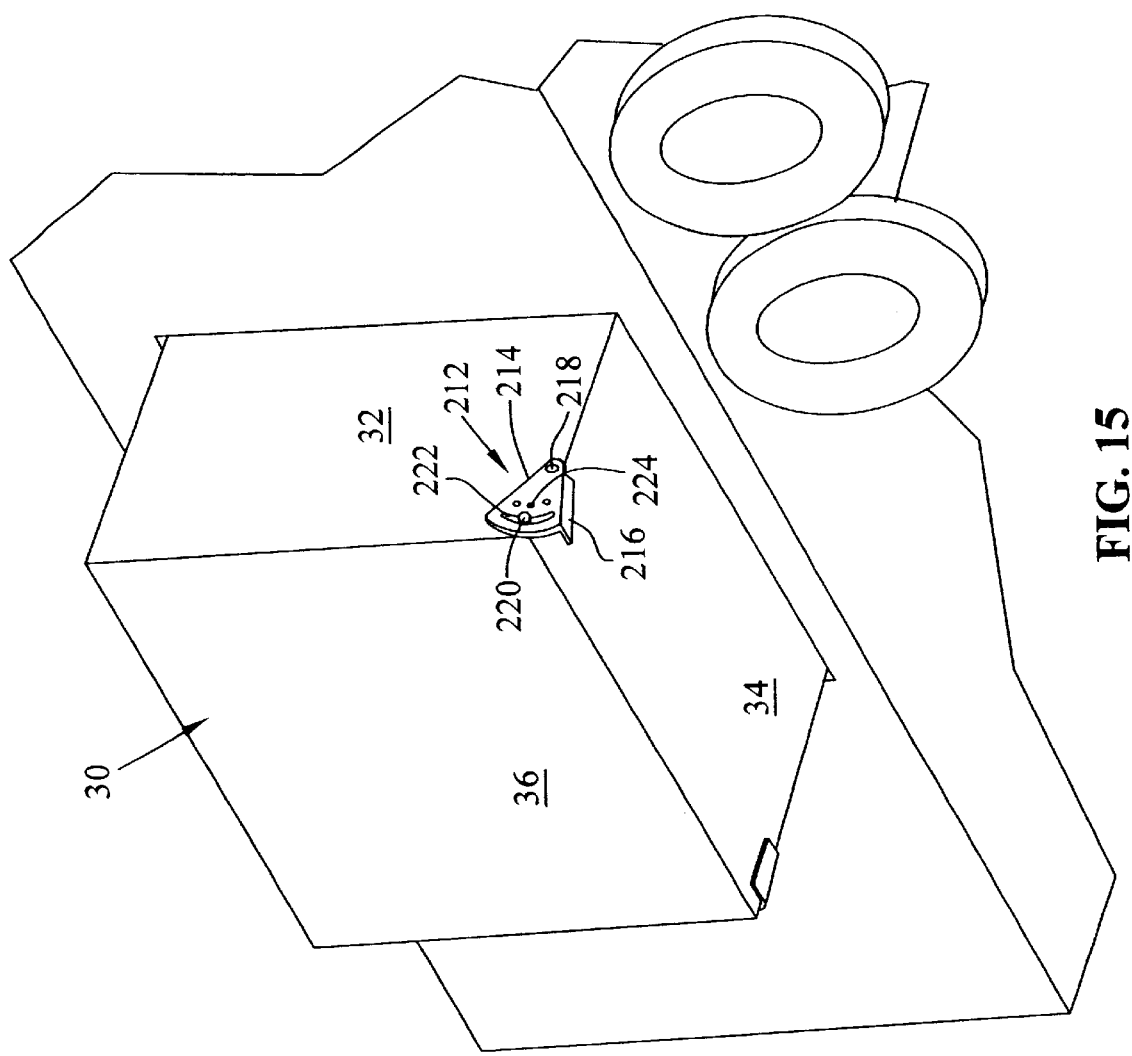
FIG. 15 is a view in perspective of a recreational vehicle and slide-out room illustrating an adjustment device made pursuant to still an another embodiment of the present invention.

Referring now to FIG. 15, a third alternate embodiment of the adjustment mechanism is illustrated at 212. Adjustment mechanisms 212 are mounted to the front end portions of the side walls 32, adjacent the corner formed between the corresponding side wall 32, the back wall 36, and the floor 34. Adjustment mechanism 212 includes a plate 214, which extends substantially parallel to the wall 32 with a lip 216 extending beneath the underside of the floor 34. Plate 214 is pivotably connected to the side wall 32 by a pivot connection 218. A fastener 220 is received in arcuate slot 222. The lip 216 rests on the wear bar (not shown) corresponding to the wear bar 210 in the embodiment of FIGS. 13 and 14 when the slide-out room 30 is in the fully retracted position. The mechanism 212 is pivotally movable from a position where lip 216 is flush with the floor 34, to a position when the lip 216 is angled relative to the floor 34 (FIG. 15 position). Accordingly, by adjusting the angular position of the plate 214, the slide-out room 30 can be raised and lowered relative to the aperture. After the position of the plate 214 is established to provide the necessary adjustment, the plate is locked in place by installing a second fastener in one of the openings 2124 after the fastener 220 is tightened.

Figure 16:
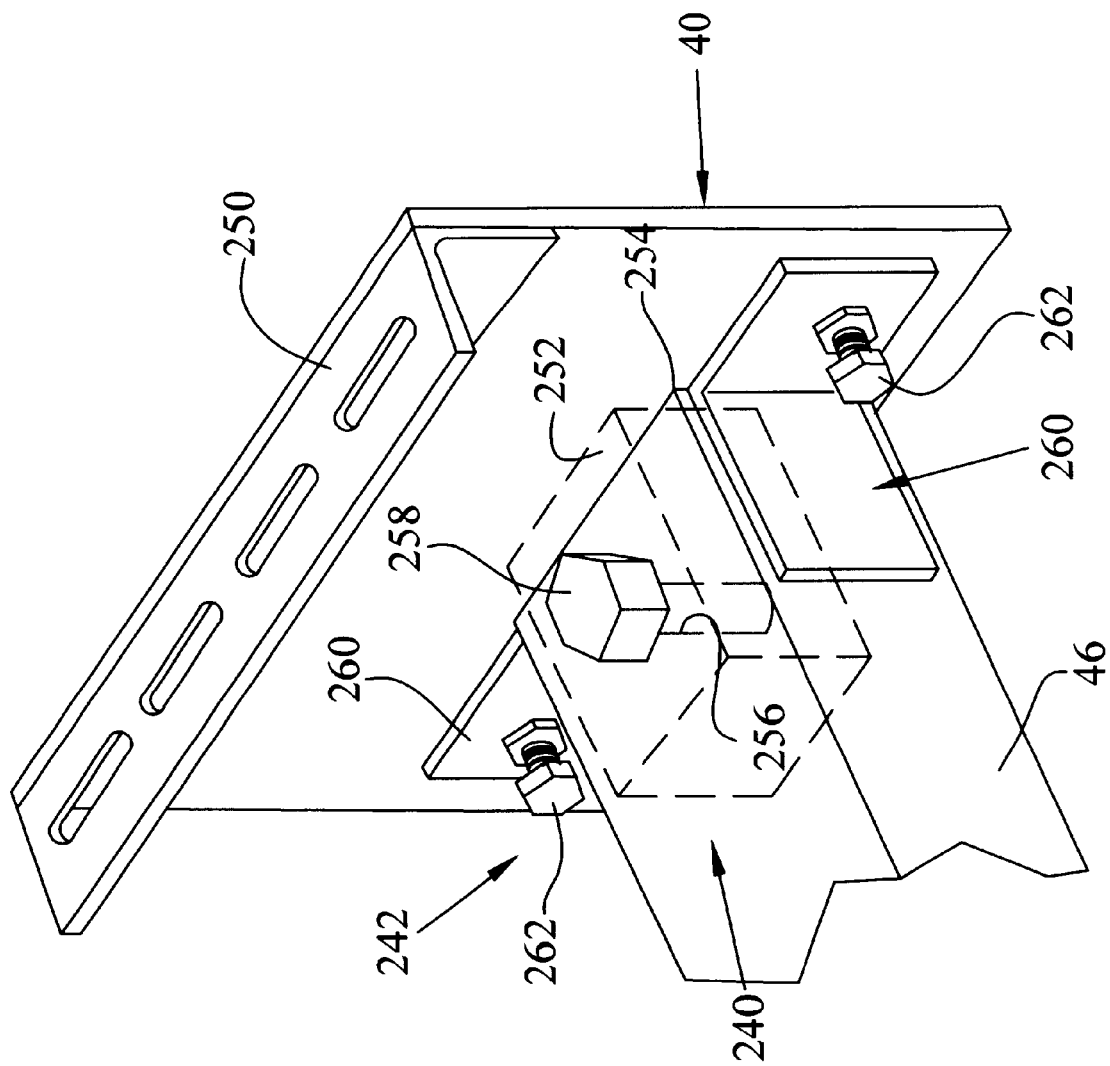
FIG. 16 is a view in perspective of that portion of the extendable member supporting the slide-out room in FIG. 1 that is attached to the back wall of the slide-out room.
Figure 17:
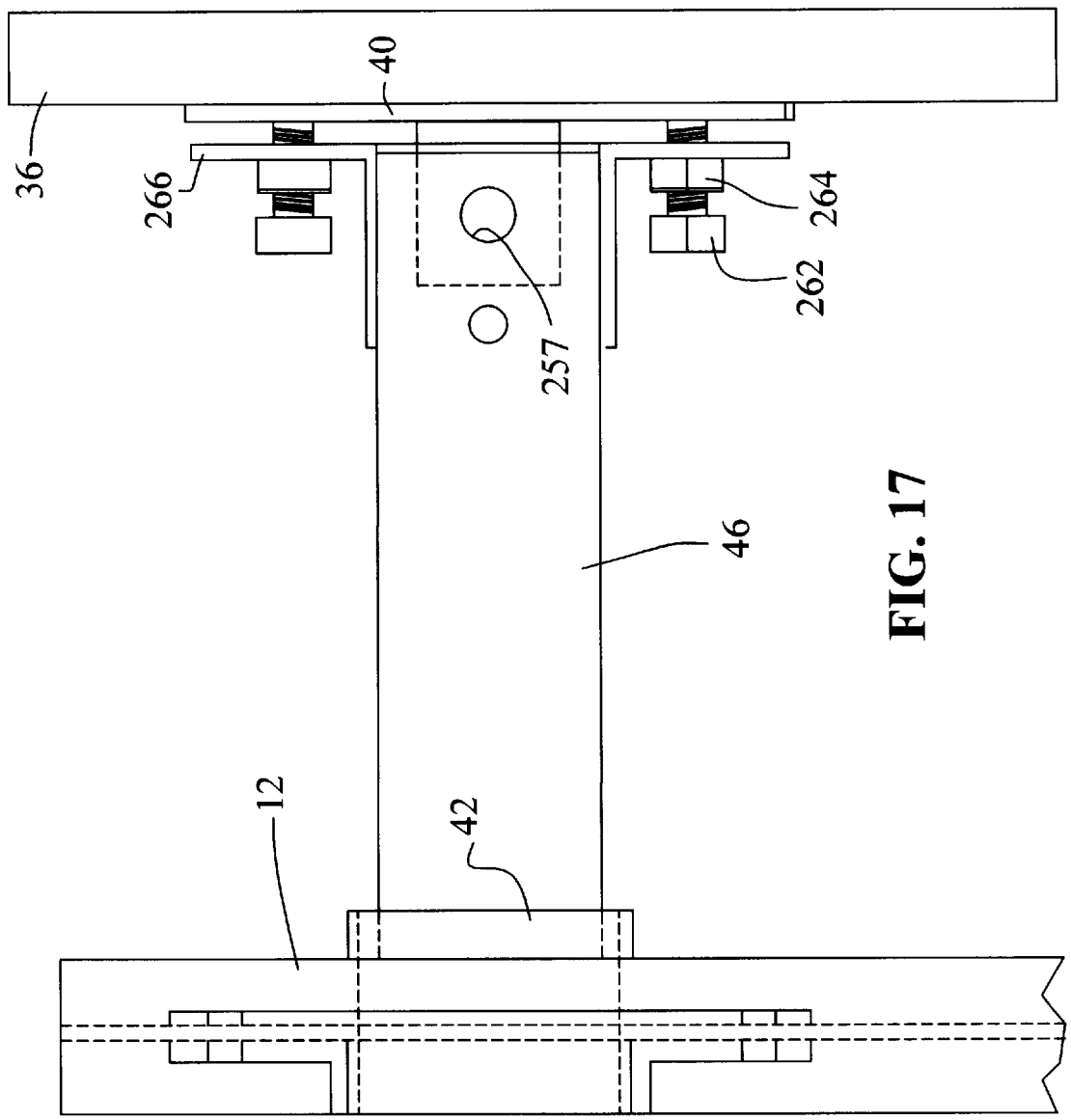
FIG. 17 is a top plan view of the attachment mechanism illustrated in FIG. 2.
Figure 18:
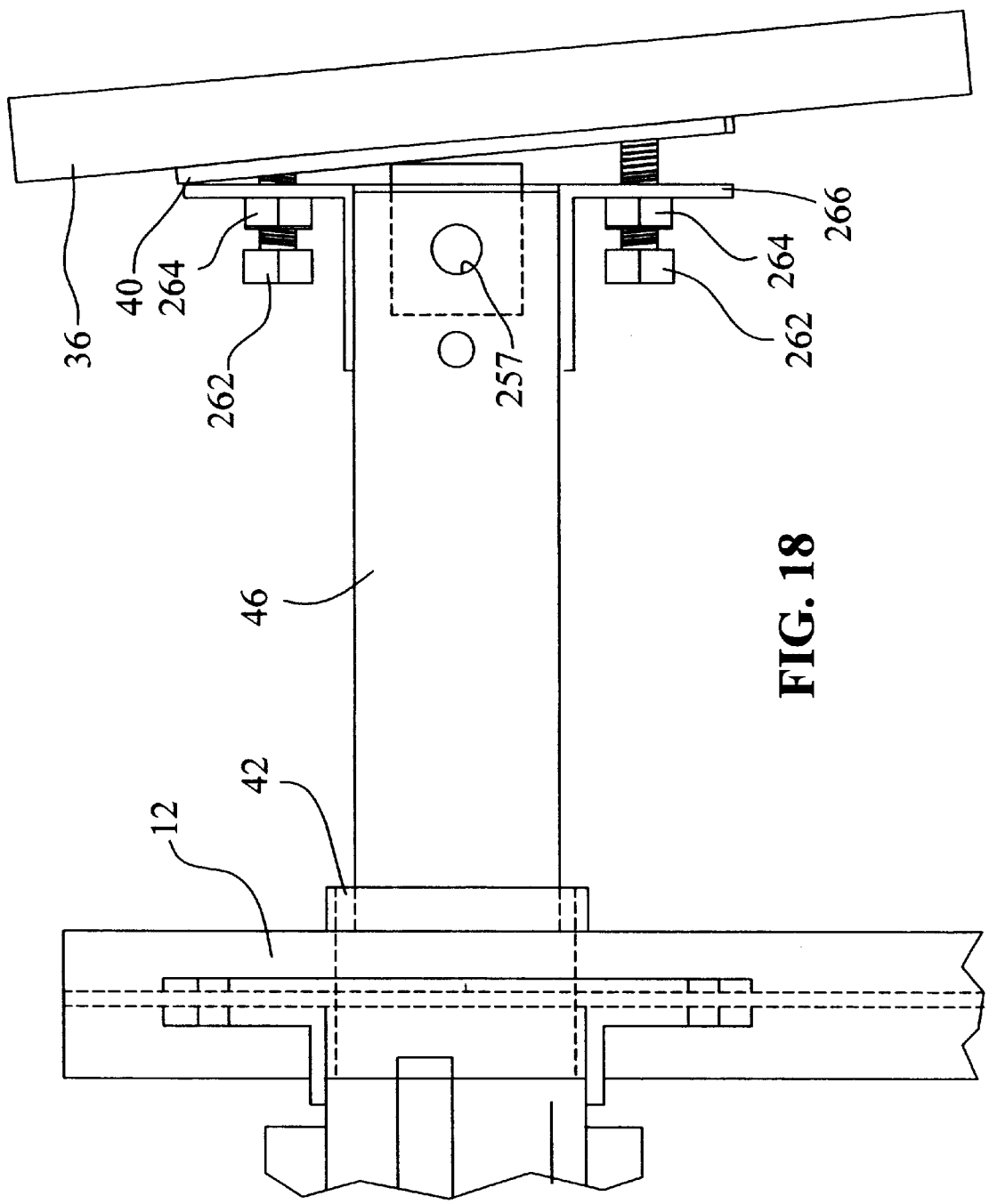
FIG. 18 is a view similar to FIG. 17, but illustrating the manner in which adjustment of the slide-out room is effected.

With reference now to FIGS. 16–18, the connecting plate 40 mentioned above will be described in greater detail. The connection plate 40 is provided with a flange 250, where a vertical leg is attached to the plate 40 and a horizontal leg is attached to the floor 34 of the slide-out room 30. A block of solid material 252 is secured to the plate 40 and is received within open end 254 of inner member 46. An opening 256 (FIG. 16) in the block 252 registers with the corresponding opening 257 in the tubular member 46 (FIG. 17). The aperture 256 is drilled and tapped to threadably receive a bolt 258. The dimensions of the block 252 (both the width and height thereof) are less than the corresponding dimensions of the open end 254. Accordingly, by rotation of the bolt 258, the plate 40 can be raised or lowered a limited distance.

The bolt 258 also acts as a pivot pin permitting rotation of the plate 40 about the bolt 258. A pair of angle flange members 260 (FIG. 16) are welded to the sides of the tubular member 46 and are provided with bolts 262 which are threaded through nuts 264 welded upon portions 266 of the members 260 which extend parallel to the connecting plate 40. Accordingly, adjustment of the bolts 262 pivot the connecting plate 40 about a limited arc as illustrated in FIG. 18. The arc is limited to that permitted by the gap between portions 266 and the plate 40, which is set by the distance between the plate 40 and the bolt 258. Accordingly, the height of the slide-out room in the extended position can be adjusted by operation of the bolt 258 to minimize the gap between the floor of the slide-out room and the floor of the main living quarters, and the adjustment mechanisms 268 can be used to adjust the back wall 30 when the room 30 is retracted.

Figure 19:
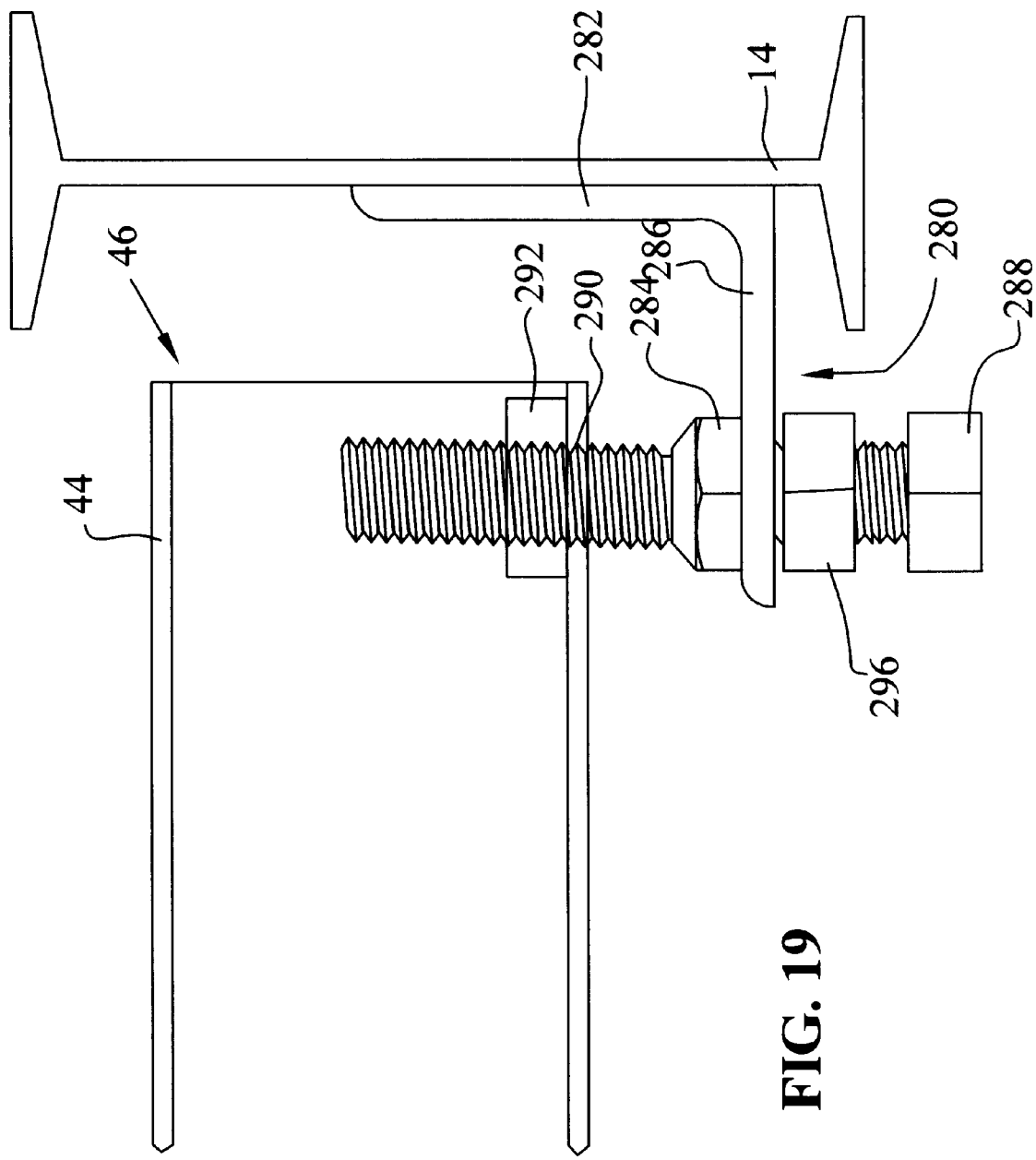
FIG. 19 depicts a further adjustment mechanism for the rear of the extendable member and its connection to the main frame.

Referring now to FIG. 19, it is also frequently necessary to adjust the tilt of the entire slide-out room 30 with respect to the aperture 28. For this reason, the outer tubular member 44 of extendable member 46 is secured to the frame member 14 supporting the side of the recreational vehicle unit 10 opposite the side through which the slide-out room 30 is extended and retracted by an adjustable connection generally indicated by the numeral 280 through which the outer tubular member 44 may be raised and lowered. As discussed above, the tubular member 44 extends through the frame member 12 through a deflectable connection. Accordingly, by raising and lowering the end of the outer tubular member 44 connected to the frame member 14, the extendable member, and particularly the inner tubular member 46 and the plate 40 which attaches the inner tubular member to the slide-out room may be lowered as the end of the outer tubular member 44 connected to frame member 44 is raised, and is raised when the end of tubular member 44 connected to frame member 14 is lowered by the adjustable connection 280. Accordingly, the tilt of the slide-out room can be adjusted through the limited arc permitted by the adjustment mechanism 280. The adjustment mechanism 280 includes an angle bracket 282 which is secured to the main frame member 14 as, for example, by welding, and includes a nut 284 secured to arm 286 of angle bracket 282. A bolt 288 extends through an aperture in the arm 286 and threadably engages the nut 284. The bolt 288 continues through an opening 290 in the wall of the main frame member 44 and then through a nut 292 which is welded on the inner surface of the tubular member 44 coaxial with the opening 290. A lock nut 296 is also rotatable on the bolt 288. By rotation of bolt 288, the end of the tubular member 44 may be raised and lowered with respect to the main frame member 14. Accordingly, the slide-out room 30 will be tilted in and out in response to raising and lowering of the tubular member 44.

The alignment mechanism of the present invention may be used singly for smaller slide-out rooms or in multiples for larger slide-out rooms or for more flexibility in aligning the slide-out room to the main living area. For instance, it may be desirable to use the alignment mechanism in pairs in some applications situated one on each side of the slide-out room aperture in the side wall of the main living area. Such an installation would provide adjustment of the back wall at both slide-out room side walls. Alternatively, an alignment mechanism is installed to adjust each of the four corners of the slide-out room floor. Access however would have to be provided to the inner most adjusters either from inside the vehicle or through access holes through the main room floor.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A mobile living quarters comprising a frame, a structure supported by said frame defining a main living area, said structure including side walls, one of said side walls defining an aperture slidably receiving a slide-out room mounted for movement through said aperture between a retracted position retracted into the main living area and an extended position extended from the main living area to provide an auxiliary living area, said slide-out room including a back wall closing said aperture when the slide-out room is in the retracted position, and an adjustment mechanism for adjusting the position of the back wall of the slide-out room relative to the aperture, said adjustment mechanism comprising a vertical lift portion and a horizontally extending actuation member movable to vary the vertical position of said vertical lift portion.

2. The mobile living quarters as cl aimed in claim 1, wherein said slide-out room includes side walls extending inwardly from said back wall through said aperture, said mobile living quarters including a pair of adjustment mechanisms acting on said slide-out room adjacent to each of said side walls.

3. The mobile living quarters as claimed in claim 2, wherein said adjustment mechanisms are mounted on said main living area.

4. The mobile living quarters as claimed in claim 2, wherein said structure includes a main living area floor supported by said frame, said slide-out room including a slide-out floor sliding over said main living area floor when the slide-out room is extended and retracted and cooperating with the main living area floor to define a gap therebetween, said adjustment mechanisms extending into said gap and being adjustable to adjust said gap when the slide-out room is in the retracted position.

5. The mobile living quarters as claimed in claim 3, wherein said adjustment mechanisms are mounted adjacent to each side of said aperture, adjacent to a front one of said sidewalls.

6. The mobile living quarters as claimed in claim 5, wherein said adjustment mechanisms are located adjacent each front corner of said slide out room.

7. The mobile living quarters as claimed in claim 4, wherein s aid adjustment mechanisms include a base mounted on said main living area floor, a lever pivotally mounted on said base and movable toward and away from said slide-out floor, said lever carrying antifriction members for engagement with said slide-out floor, and a jack mechanism to vary the angular position of said lever to thereby adjust the gap between said floors.

8. The mobile living quarters as claimed in claim 7, wherein said jacking mechanism is comprised of a jack bolt having a bolt head facing outwardly from within said gap, and a wedge positioned under said lever, whereby movement of said jack bolt raises and lowers said lever.

9. A mobile living quarters comprising a frame, structure supported by said frame defining a main living area, said structure including side walls, one of said side walls defining an aperture slidably receiving a retractable room mounted for movement through said aperture between a retracted position retracted into the main living area and an extended position extended from the main living area to provide an auxiliary living area, said retractable room including a back wall closing said aperture when the retractable room is in the retracted position, an extendible member mounted on said frame for supporting said retractable room for movement between the extended and retracted positions, and an adjustment mechanism for adjusting the position of the retractable room relative to said aperture, said adjustment mechanism comprising a wedge portion cooperable between a floor of the retractable room and a floor of said main living area, and movably adjustable to vary the distance between said main living area floor and said retractable room floor.

10. The mobile living quarters as claimed in claim 9, wherein said retractable room floor slides over said main living area floor when the retractable room is extended and retracted and cooperates with said main living area floor to define a gap therebetween, said wedge portion of said adjustment mechanism being operable in said gap to vary the dimension of said gap.

11. The mobile living quarters as claimed in claim 10, wherein said retractable room includes side walls extending inwardly from said back wall through said aperture, and a pair of said adjustment mechanisms are positioned adjacent to each of said side walls.

12. The mobile living quarters as claimed in claim 11, wherein said adjustment mechanisms are mounted on said main living quarters.

13. The mobile living quarters as claimed in claim 12, wherein said adjustment mechanisms are located adjacent each corner of said retractable room.

14. The mobile living quarters as claimed in claim 9, wherein said adjustment mechanisms each include a base mounted on said main living area floor, a lever pivotally mounted on said base and movable toward and away from the retractable room floor, said lever carrying anti-friction members for engagement with the retractable room floor, and a jack mechanism to vary the angular position of said lever to thereby adjust the gap between said floors.

15. The mobile living quarters as claimed in claim 14, wherein said jack mechanism actuates in a horizontal axis to create vertical movement of said anti-friction members.

16. The mobile living quarters as claimed in claim 9, wherein said adjustment mechanisms comprise a plate member attached to said retractable room, with a portion of said plate being variable downwardly relative to said floor of said retractable floor, and a wear bar mounted to said main room floor, whereby when said retractable room is retracted, said downwardly extending portion of said plate member strikes said wear bar causing an upward movement of said retractable room.

17. The mobile living quarters as claimed in claim 16, wherein said plate member is attached to a side of said retractable room and is pivotable relative to said sidewall, and includes a lip portion defining said wedge.

18. The mobile living quarters as claimed in claim 16, wherein said adjustment mechanism comprises a wedge plate of varying thickness from front to back, and a wear bar spanning said aperture, said wedge plate being attached to an underside of said retractable room floor, and is movable towards and away from the underside, whereby the wedge plate strikes the wear bar upon retraction to vary the height of the back wall.

19. A mobile living quarters comprising a frame, a structure supported by said frame defining a main living area, said structure including side walls, one of said side walls defining an aperture slidably receiving a slide-out room mounted for movement through said aperture between a retracted position retracted into the main living area and an extended position extended from the main living area to provide an auxiliary living area, said slide-out room including a back wall closing said aperture when the slide-out room is in the retracted position, and an adjustment mechanism for adjusting the position of the back wall of the slide-out room relative to the aperture to cause said back wall to register with said aperture, wherein said adjustment mechanism includes a base mounted on a floor of said main living area, a lever mechanism pivotally mounted on said base and movable toward and away from a floor of said slide-out room, said lever carrying at least one antifriction member for engagement with the slide-out room floor, an actuation mechanism to adjust the angular position of said lever to thereby adjust the gap between said floors.

20. The mobile living quarters according to claim 19, wherein said slide-out room includes side walls extending inwardly from said back wall through said aperture, said mobile living quarters including a pair of adjustment mechanisms acting on said slide-out room adjacent to each of said side walls.

21. The mobile living quarters according to claim 19, wherein said at least one antifriction member is a roller.

22. The mobile living quarters according to claim 19, wherein said base is mounted on the floor of the main living area, with the antifriction member acting on the underside of the slide-out room floor.

23. The mobile living quarters according to claim 19, wherein said lever is controllable to various vertical heights.

24. The mobile living quarters according to claim 23, wherein a wedge is positioned between said lever and said base portion.

25. The mobile living quarters according to claim 24, further comprising a jack bolt interconnected to said wedge, whereby said jackscrew is movable towards and away from said lever to raise and lower said lever, and said at least one anti-friction member.

26. A mobile living quarters comprising:
   a main room having a main floor and a side wall, said side wall having an opening;
   an expandable room movable relative to said main room between a retracted position retracted within the main room and an extended position extended from the main room through said opening to provide an auxiliary living area, and having a floor movable over said main floor;
   a gap between said main room floor and said expandable room floor, and;
   an adjustment jack positioned in said gap and cooperable with said expandable room floor and said main room floor, whereby said jack is accessible for adjustment without removal of said slide-out room.

27. The mobile living quarters of claim 26, wherein said adjustment jack includes:
   a base plate attachable to one of said floors;
   a pivot assembly pivotably attached to said base plate and bearing on the other of said floors; and
   a wedge assembly cooperable to adjust the pivot angle of said pivot assembly relative to said base plate thereby raising and lowering said pivot lever opposite end between a minimum position and a maximum position to vertically adjust the position of the slide-out room relative to the main room.

28. The mobile living quarters of claim 27, wherein said pivot assembly further includes:
   a pair of camming blocks attached to said pivot end of said pivot lever and operably engaged with said wedge assembly; and
   a roller mounted at said opposite end of said pivot lever, in rolling engagement with the other of the main room floor or slide-out room floor.

29. The mobile living quarters of claim 28, wherein said wedge assembly includes:
   a pivot bracket attached to said base plate, said pivot bracket defining a first hole therethrough;
   a stop bracket attached to said base plate in spaced relation with said pivot bracket, said stop bracket defining a second hole therethrough and axially aligned said first hole;
   an adjusting screw having an adjustment end and a free end, said adjusting screw being disposed through said first and second holes; and
   a wedge threadably engaged with said adjusting screw and slidably disposed on said base plate between said pivot bracket and said stop bracket so that said wedge slides toward said pivot bracket to engage said camming blocks to increase the pivot angle of said pivot lever when said adjusting screw is rotated in one direction and said wedge slides toward said stop bracket to decrease the pivot angle of said pivot lever when said adjusting screw is rotated in an opposite direction.

30. The mobile living quarters of claim 29, wherein said wedge assembly further includes a retaining nut fixedly attached to said free end of said adjustment screw to prevent withdrawal of said adjustment screw.

31. The mobile living quarters of claim 26, wherein said expandable room includes a bed portion expandable to enlarge a bedroom area of said mobile living quarters, said expandable room including an adjustment in each corner of said expandable room to independently vary the height of each corner.

* * * * *

UNITED STATES PATENT AND TRADEMARK OFFICE
CERTIFICATE OF CORRECTION

PATENT NO.     : 6,527,324 B2
DATED          : March 4, 2003
INVENTOR(S)    : McManus et al.

It is certified that error appears in the above-identified patent and that said Letters Patent is hereby corrected as shown below:

Column 9,
Line 17, "cl aimed" should be -- claimed --
Line 43, "s aid" should be -- said --

Signed and Sealed this

Twenty-second Day of April, 2003

JAMES E. ROGAN
*Director of the United States Patent and Trademark Office*